(12) United States Patent
Godoy Melo et al.

(10) Patent No.: US 10,584,423 B2
(45) Date of Patent: Mar. 10, 2020

(54) EWS MODULE DEVICE FOR ELECTRO-WINNING AND/OR ELECTRO-REFINING, INTERCONNECTION PROCESS, AND OPERATING PROCESS THEREOF

(71) Applicants: Proter S.A., Santiago (CL); Ewtech Investigación Desarrollo e Innovación S.p.A., Santiago (CL)

(72) Inventors: Paulina Alejandra Godoy Melo, Santiago (CL); Orlando Enrique Godoy Olguin, Santiago (CL)

(73) Assignees: Proter S.A., Santiago (CL); Ewtech Investigación Desarrollo e Innovación S.p.A., Santiago (CL)

(*) Notice: Subject to any disclaimer, the term of this patent is extended or adjusted under 35 U.S.C. 154(b) by 0 days.

(21) Appl. No.: 15/541,166

(22) PCT Filed: Nov. 25, 2015

(86) PCT No.: PCT/CL2015/000061
§ 371 (c)(1),
(2) Date: Jun. 30, 2017

(87) PCT Pub. No.: WO2017/088079
PCT Pub. Date: Jun. 1, 2017

(65) Prior Publication Data
US 2018/0258545 A1    Sep. 13, 2018

(51) Int. Cl.
*C25C 7/00* (2006.01)
*C25C 1/00* (2006.01)
(Continued)

(52) U.S. Cl.
CPC ............ *C25C 1/12* (2013.01); *C22B 15/0071* (2013.01); *C25C 7/02* (2013.01); *C25C 7/06* (2013.01);
(Continued)

(58) Field of Classification Search
CPC .... C25C 7/06; C25C 7/00; C25C 7/02; C25C 1/00; C25C 3/00
(Continued)

(56) References Cited

FOREIGN PATENT DOCUMENTS

| MX | 2011011427 A | 11/2011 |
|---|---|---|
| WO | 2006019971 A2 | 2/2006 |

(Continued)

OTHER PUBLICATIONS

European Patent Office, International Search Report and Written Opinion issued in counterpart Application No. PCT/CL2015/000061 dated Jun. 21, 2016, 6 pages.

*Primary Examiner* — Zulmariam Mendez
(74) *Attorney, Agent, or Firm* — Wood Herron & Evans LLP

(57) ABSTRACT

The invention relates to an EWS module device for electro-winning and/or electro-refining, based on a saturated leaching solution of PLS/electrolyte/raffmate/ILS without solvent extraction, characterised by comprising: a tank (10 and 12); a set of electrolytic cells contained within the tank, wherein the cells are electrically and volumetrically separated by the internal walls of the module (14), with the cells being connected in series by a joining board or capping board (3); an intercellular bar (1); an intercellular bar guide (2); inlet and outlet ducts for the PLS/electrolyte/raffinate/ILS (17) and (11) for each cell independently; and each EWS module is in turn connected to the other modules by an inter-module connector (18), and same in turn control the connection and disconnection of the EWS modules by an interrupter (25);
(Continued)

operating process of the EWS module device; and connection and disconnection process between different EWS module devices.

12 Claims, 13 Drawing Sheets

(51) Int. Cl.
    *C25C 3/00*     (2006.01)
    *C25C 1/12*     (2006.01)
    *C25C 7/02*     (2006.01)
    *C25C 7/06*     (2006.01)
    *C25C 7/08*     (2006.01)
    *C22B 15/00*     (2006.01)

(52) U.S. Cl.
    CPC .............. *C25C 7/08* (2013.01); *Y02P 10/234* (2015.11); *Y02P 10/236* (2015.11)

(58) Field of Classification Search
    USPC ........................................................ 205/574
    See application file for complete search history.

(56) References Cited

FOREIGN PATENT DOCUMENTS

| | | |
|---|---|---|
| WO | 2006049631 A2 | 5/2006 |
| WO | 2013060786 A1 | 5/2013 |
| WO | 2013117805 A1 | 8/2013 |
| WO | 2014100908 A1 | 7/2014 |

EWS MODULE DEVICE FOR ELECTRO-WINNING AND/OR ELECTRO-REFINING, INTERCONNECTION PROCESS, AND OPERATING PROCESS THEREOF

TECHNICAL FIELD OF THE INVENTION

The technical field of this invention refers to mining, specifically to the devices for hydrometallurgy, electrowinning and/or electrorefining.

BACKGROUND OF THE INVENTION

Obtaining copper cathodes on a large scale is a process known in the state of the art. This process, to be profitable, is intensive for large volumes of material to be obtained. The basis of this process is one used for the first time in south Wales in 1869, where electrorefining was tested as a purification process for metallic copper that is carried out in electrolytic cells and consists of the application of an electric current to dissolve impure copper. In this way, the purest possible electrolytic copper is obtained, with 99.99% purity, which permits its utilization as an electric conductor, among other applications. Chile is one of the principle producers and refiners of copper in the world.

The total process for electrowinning copper is known by the technicians in this subject and operates as follows: it starts with the crushing of the material (CH), then comes the agglomeration process (AG), this is followed by the lixiviation process (LX), followed by the extraction by solvents (SX), to end, finally, with the electrowinning (EW), to end with the obtaining of a copper cathode.

The stages presented previously, in that order, reveal the known process. Each one of the stages, individually, has its own technical problems, of which we wish to highlight those that are presented below.

The Electrowinning (EW) stage in itself, is a stage that requires devices with specific electrical and volumetric capacities in order to obtain copper cathodes, especially when the copper solution is not concentrated in a previous stage of extraction by solvents.

On the other hand, the traditional electrowinning (EW) stage has always been executed at a fixed location due to the large number of equipment, electrical support, intensive process and handling of high tonnages of material that this operation requires.

The electrolytic extraction processes (EW) are generally carried out in undivided electrochemical cells that contain an electrolytic bath (with a high concentration of copper previously extracted by solvents) and a multiplicity of anodes and cathodes. In such processes, such as for example the electroplating of copper, the electrochemical reaction that takes place in the cathode (manufactured in stainless steel), conducts the deposition of copper in metallic form on the cathode itself. The anode, generally manufactured of lead, is consumed slowly forming the anodic sludges and producing gaseous oxygen, as residual elements (WO2013/060786).

In general, what is known by the state of the art mentions that this type of process uses continuous current in parallel through each anode-cathode pair, as mentioned in patent WO 2013117805. In fact, rectifiers are used to compensate the system's direct current input with the current the electrochemical process on its own requires.

Another of the common stages of the total process in electrowinning, but prior to subjecting the electrolyte to the current, is the ore enrichment or concentration stage by extraction of same with solvents, a stage also called Pregnant Leach Solution (PLS). This stage is necessary to reach a copper concentration in the electrolyte of about 7 to 48 g/L of electrolyte. These concentrations are necessary to make the electrowinning process economically viable in medium and large-scale mining.

SUMMARY OF THE INVENTION

In a first aspect of this invention, it is a EWS (Electrowinning Series) module-type device that permits the obtaining of cathodes of electrolytic copper using the pregnant leach solution (PLS) directly in the electrowinning (Lixiviation with Electrowinning Direct-LED), avoiding the stage of ore concentration by extraction with solvents (FIG. 1, L1, L2, L3 and L4).

On the other hand, with this type of cell cathodes may also be obtained from solutions of:
Electrolyte with a high concentration of copper (of 4 to 50 g/l) in solution.
Electrolyte disposal solution (over 20 g/1 of copper)
Solution of raffinate with a low concentration of copper
Solution of ILS (Intermediate Leach Solution) with a low concentration of copper.

A second aspect of this invention is that the EWS module devices are mounted in modular form, connected electrically from one EWS module to another by means of the cathodes-anodes and continuous current switches and the complete device can be mobilized physically depending on the demand of the process itself.

A third aspect of this invention involves the type of current with which the EWS module device operates, with which the electrolyte dissolved in the electrowinning is refined, in such a way that in this invention it behaves like a circuit of continuous current in series and not in parallel as it is executed at present.

A fourth aspect of this invention is that the EWS module permits working with larger volumes of a strong solution from the lixiviation and with ranges from the smaller concentrations of dissolved copper up to high concentrations of copper (conventional electrolyte).

A fifth aspect of this invention is to achieve a high velocity of mass transference towards the cathode with a low specific area of the same ($m^2$/kg of cathode), with low concentrations of copper and high incoming flows in the cell.

A seventh aspect is to use a low continuous current in the EWS module device with a lower energy consumption (increasing current efficiency in 99% in the EW process) because the traditional processes use a high continuous current, making its influence felt in a high-energy consumption. The continuous current delivered by the rectifier is exactly the same as the one applied in the electrowinning process for each cathode.

An eighth aspect is that the consumption of electric current becomes independent of the number of cathodes and anodes.

A ninth aspect is that the EWS module has between 2 to 100 separations, preferably 10 separations that correspond to the electrowinning cells, where each cell has supports for the anodes and cathodes that permit the regulation of the separation between anode and cathode, an independent aeration system for each cell and its respective outlets for the solution using the overflow method.

A tenth aspect is the process of connecting and disconnecting the EWS modules from each other.

Finally, this EWS module device produces a big impact on small and medium-sized mining because of the low investment and operation cost that these devices require and being able to outsource this part of the process that adapts to the production capacity they possess because it is modular and mobile.

The technical problems that the EWS module device hopes to resolve are:

obtain copper cathodes with electrolytic quality based on different types of solutions:
  a pregnant leach solution (PLS), without passing through the step of concentration by extraction using solvents (SX)
  an electrolyte with a high concentration of copper in solution that originates from the extraction by solvents (SX) stage
  an ILS solution with a low concentration of copper
  a raffinate solution with a low concentration of copper
  A discard electrolyte with a high concentration of copper in solution.

obtain that the continuous current of the electric power system in the EWS module is exactly the same as the current that the electrochemical process requires for electrowinning copper cathodes, that is, the electrowinning process is a circuit of continuous current in series.

Achieve electrowinning copper directly from an ore lixiviation solution with a low concentration of copper, that contains between 4 and 45 g/L of copper in solution.

make use of an electrowinning-intensive process where it is required (physically), for the amounts that are required and in the shortest possible time and likewise, the plant can be moved when the work site no longer requires its services.

Obtain high velocity mass transference towards the cathode with a low specific surface of the same ($m^2$/kg of cathode), with low concentrations of copper and high incoming flows in the EWS module.

use of a low continuous current in the rectifier that feeds the EWS module with a lower energy consumption (increasing current efficiency in 99%) unlike the traditional processes where the rectifiers operate at high currents, which results in a higher energy consumption.

Making the consumption of electric current independent of the number of cathodes and anodes.

Simple connection and disconnection between EWS modules.

Handling of volumes of electrolyte in parallel and not in series as is done traditionally.

Figure 1:
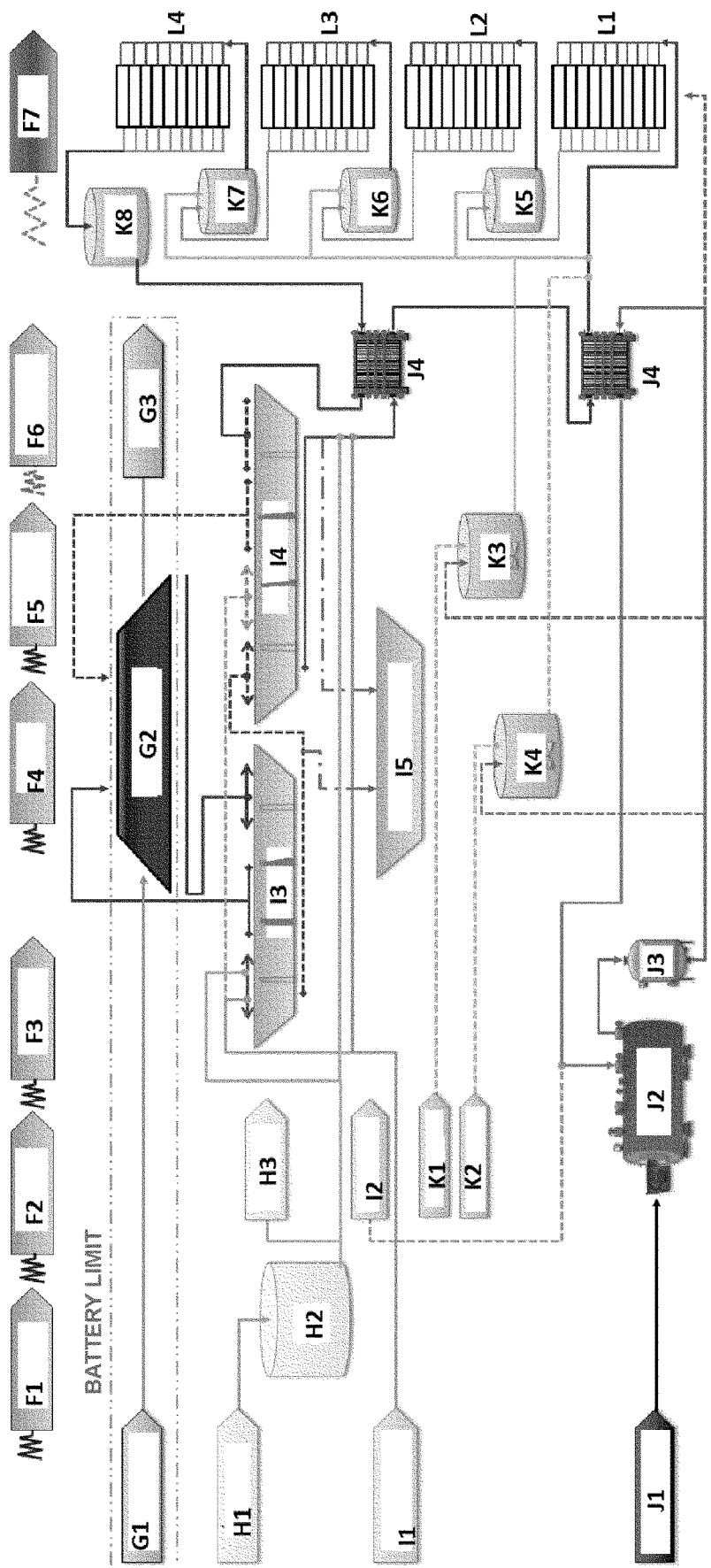
FIG. 1/13

The figure represents a general diagram of the productive process in which this invention is inserted.

The line of arrows of the upper part of the diagram shows the physical phenomena that the water suffers in the different positions of the movement of the ore:

X: Impulse pumps
0: Flow controllers and temperature meters
F1: Evaporation of the mixed pool
F2: Evaporation of the ILS pool
F3: Evaporation piles
F4: Evaporation in EW
F5: Decomposition of water by electrolysis
F6: Washing water to discard
F7: Production of copper cathode The line immediately below the arrows of the upper part shows the behavior of the solid material in the different positions of the movement of the ore:

G1: Agglomerated ore from the crusher-binder
G2: Dynamic pile
G3: Gravel to dump In the following line of arrows, the handling of the acid is presented:

H1: Sulfuric acid from trucks
H2: Acid TK
H3: Sulfuric acid to agglomeration.

In the following line of arrows, the handling of the process water is presented:

I1: Process water from water supply
I2: Service water
I3: ILS pool
I4: Mixed pool
I5: Emergency pool The last line presents the system's heating network:

J1: Oil supply
J2: Boiler
J3: Water conditioning chamber
J4: Heat exchangers

There are other parts associated to the adaptation and preparation of the LPS before the EWTECH-LED:

K1: Chemical product, concentrated Guar
K2: Chemical product, concentrated cobalt sulfate
K3: Guar TK, this is a tank where the Guar is diluted in water and is left at an optimum concentration to be applied to the PLS that is sent to the cells of the modules of the EWTECH-LED plant.
K4: Cobalt TK, this is a tank where the cobalt sulfate is diluted in water and is left at an optimum concentration to be applied to the PLS that is sent to the cells of the EWS modules of the EWTECH-LED plant.
K5: TK Bank 2, this is a tank where the PLS/Electrolyte/Raffinate/ILS is received, in series, when it has passed once through the first bank of the EWTECH-LED system. (Without restricting the number of banks to be used except when the concentration of the PLS/Electrolyte/Raffinate/ILS reaches a range below 4 gr/L.)
K6: TK Bank 3, this is a tank where the PLS/Electrolyte/Raffinate/ILS is received in series when it has passed once through the second bank of the EWTECH-LED system. (Without restricting the number of banks to be used except when the concentration of PLS/Electrolyte/Raffinate/ILS reaches a range below 4 gr/L.)
K7: TK Bank 4, this is a tank where the PLS/Electrolyte/Raffinate/ILS is received, in series, when it has passed once through the third bank of the EWTECH-LED system. (Without restricting the number of banks to be used except when the concentration of copper in the PLS solution reaches a range below 4 gr/L.)
K8: TK transfer bank, this is a tank where the PLS is received, in series, that has passed once through the fourth bank of the EWTECH-LED system. (Without restricting the number of banks to be used except when the concentration of the PLS reaches a range below 4 gr/L.) The PLS used is transferred to the mixed pool.

L1: EWTECH-LED bank N° 1 (this invention)
L2: EWTECH-LED bank N° 2 (this invention)
L3: EWTECH-LED bank N° 3 (this invention)
L4: EWTECH-LED bank N° 4 (this invention)

FIG. 2/13

This figure represents a flow diagram of the Electrowinning process direct in series EWTECH-LED.

In the line of arrows of the lower right part of the diagram, the physical phenomena that the water suffers in the different positions of the movement of the ore are presented:

F5: Decomposition of water by electrolysis
F6: Washing water to discard
F7: Production of copper cathodes
F8: Evaporation of water by atmosphere
F9: Cathode washing water The following line of arrows presents the handling of the acid:

X: Impulse pumps
0: Flow controllers and temperature meters
H4: Sulfuric Acid to EW-LED.

The following line of arrows presents the handling of the process water:

16: Process water to EW-LED
17: LX emergency shower
18: Service water for human consumption The last line presents the system's heating network:

J1: Oil supply
J2: Boiler
J3: Water conditioning chamber
J4: Heat exchangers

There are other parts associated to the adaptation and preparation of the PLS before the EWTECH-LED:

K1: Chemical product, concentrated Guar
K2: Chemical product, concentrated cobalt sulfate
K3: Guar TK, this is a tank where the Guar is diluted in water and is left at an optimum concentration to be applied to the PLS that is sent to the cells.
K4: Cobalt TK, this is a tank where the cobalt sulfate is diluted in water and is left at an optimum concentration to be applied to the PLS that is sent to the cells.
K5: TK Bank 2, this is a tank where the PLS is received, in series, when it has passed once through the first bank of the EWTECH-LED system. (Without restricting the number of banks to be used except when the concentration of the PLS reaches a range below 4 gr/L.)
K6: TK Bank 3, this is a tank where the PLS is received, in series, when it has passed once through the second bank of the EWTECH-LED system. (Without restricting the number of banks to be used except when the concentration of the PLS reaches a range below 4 gr/L.)
K7: TK Bank 4, this is a tank where the electrolyte in series is received when it has passed once through the third bank of the EWTECH-LED system. (Without restricting the number of banks to be used except when the concentration of copper in the PLS solution reaches a range below 4 gr/L.)
K8: TK transfer bank, this is a tank where the PLS is received, in series, that has passed once through the fourth bank of the EWTECH-LED system. (Without restricting the number of banks to be used except when the concentration of the PLS reaches a range below 4 gr/L.) The PLS used is transferred to the mixed pool.

L1: EW TECH-LED bank N° 1
L2: EWTECH-LED bank N° 2
L3: EWTECH-LED bank N° 3
L4: EWTECH-LED bank N° 4

The following line of arrows presents the handling of the PLS and a line:

M3: PLS/PLS recirculated from LX
M4: PLS recirculated/raffinate to LX

The following numbering also shows:

21: PLS to conditioning
22: Sulfuric acid to line
23: Process water to line
24: PLS to E/E heat exchanger
25: PLS to E/A heat exchanger
26: Cobalt sulfate to Cobalt Sulfate TK
27: Guar to Guar TK
28: Cobalt sulfate solution
29: Guar solution to distribution
30: Guar solution to Bank EW 1
31: Guar solution to Bank EW 2
32: Guar solution to Bank EW 3
33: Guar solution to Bank EW 4
34: PLS to Bank EW 1
35: PLS to Bank EW 2
36: PLS to Bank EW 3
37: PLS to Bank EW 4
38: PLS to Transfer TK
39: PLS in recirculation to pool
40: Hot water from heater
41: Hot water to Cobalt Sulfate TK
42: Hot water to Guar TK
43: Hot water to heat exchanger
44: Hot water to cathode washing
45: Hot water in return
46. Process water to services and operation
47. Water to EW-LED emergency service
48. Service water to human consumption
49. Process water to replacement
50: Water to heater
51: Petroleum to heater
52: Evaporation of water in EW bay
53: Decomposition of water in EW bay
54. Cathodic copper
55: Discharge of raffinate to LX

FIG. 3/13

The figure on the left represents the lateral exterior view of a EWS module of 4 cells.

The figure in the center corresponds to a lateral interior section of an EWS module of 4 cells.

The figure on the right presents the upper and lower filling circuits of the PLS/Electrolyte/Raffinate/ILS.

1: Intercell bar
2: Intercell guide bar
3: Capping board
4: Primary collector with multiple unitary outlets for each module
5: Secondary collector with single outlet of the harvesting of the primary collector
6. Cathode
7. Transversal bar of the cathode
8. Transversal bar of the anode
9. Structural arm of the anode
10. Exterior wall of the module 11. Holes for filling the PLS/Electrolyte/Raffinate/ILS, connection piping ¾ NPT 16. Anodic/cathodic supports 17. Discharge of individual solution by overflow

FIG. 4/13

The image on the upper left corresponds to a lateral interior representation of the module, in the center and right one can see front and rear exterior lateral views of the module respectively.

The lower left image represents the same module with 10 cells in a rear interior lateral view.

The inferior image of the center represents a module in volume with 10 cells in a rear exterior view at an angle that permits viewing the discharge by overflowing of the PLS/Electrolyte/Raffinate/ILS.

The image on the lower right represents a module in volume with 10 cells in an isometric exterior view at an angle that permits seeing the entry and exit by overflow of the PLS/Electrolyte/Raffinate/ILS, including the PL S/Electrolyte/Raffinate/ILS entry pipes.

1. Intercell bar
2. Intercell guide bar
6. Cathode
9. Structural arm of the anode
10. Exterior wall of the module
11. Holes for the filling of the PLS/Electrolyte/Raffinate/ILS, connection piping ¾ NPT
13. Anode
14. Internal wall of the module
15. Cell
17. Exit of individual solution by overflow.

FIG. 5/13

The figure on the upper left represents a stripped conceptual volumetric image of the module, the image on the upper right corresponds to an upper lateral-frontal volumetric integral image with a section of the module with cathodes and anodes, and finally, the lower image presents an upper lateral-frontal volumetric integral detailed image of the module without cathodes and anodes. (For greater clarity, all the images do not show the entry pipes of PLS/Electrolyte/Raffinate/ILS.

1. Intercell bar
2. Intercell guide bar
3. Capping board
4. Primary collector with multiple unitary outlets for each module
5. Secondary collector with single outlet of the gathering of the primary collector.
6. Cathode
11. Holes for filling of the PLS/Electrolyte/Raffinate/ILS, connection piping ¾NPT
12. External lateral wall of the module (this wall is narrower than the frontal wall)
13. Anode
14. Internal wall of the module
15. Cell
16. Anodic/cathodic supports
17. Exit of individual solution by overflow

FIG. 6/13

The figures on the upper left present a view from above of the module where the position of the cathodes and anodes of 4 cells (upper figure) can be seen and where the module is seen empty for 4 cells (inferior figure).

The upper figure on the right presents a view from above of the 10-cell module without cathodes and anodes.

The figure on the lower left presents a volumetric view from above of the 10-cell module without cathodes and anodes.

The figure on the upper right presents an upper schematic view of the 10-cell module with the entry pipes of the PLS/Electrolyte/Raffinate/ILS and with the exit cavities for the same.

1. Intercell bar
2. Intercell guide bar
3. Capping board
10. Exterior wall of the module
11. Holes for filling of the PLE/Electrolyte/Raffinate/ILS and connection piping ¾NPT.
14. Internal wall of the module
14. Cell
16. Anodic/cathodic supports
17. Exit of individual solution by overflow

FIG. 7/13

This figure shows, on the left, an isometric view in volume of the layout of the cathodes and anodes in the EWS module. On the other hand, positioned on the right in the upper center there is a zoom on the connections between the electrodes and the Capping board, with a triangular type intercell bar, the figure of the lower center shows the same configuration but with a circular type intercell bar, in the upper right the above-mentioned diagram presents an upper view of the capping board, under this, also to the right of the total diagram, there are two lateral views of the capping board, the upper image presents a triangular type intercell bar and the inferior image a circular type intercell bar.

1. Intercell bar
2. Intercell guide bar
3. Capping board
18. Intermodule connector (this piece permits connecting the continuous current switches, connecting or disconnecting each module electrically).

FIG. 8/13

The figure on the right clearly presents the devices in volume of the exit of the PLS/Electrolyte/Raffinate/ILS from the EWS module.

The figure on the left presents the separation that must exist between the collectors that permits an adequate isolation, avoiding leaks of the current of the electrowinning process (the outlet tubes of the first collector are not in contact with any piece of the second collector.

4. Primary collector with multiple unitary outlets for each module.
5. Secondary collector with only outlet of the harvesting of the primary collector
17. Exit of individual solution by overflow
19. Only exit of PLS/Electrolyte/Raffinate/ILS of the secondary collector.

FIG. 9/13

The upper figure represents an extended structural descriptive diagram of the EWS module (possesses more than 4 modules), where one can clearly see how the electric field in series runs maintaining an even load volume in all the cells, EWS modules and in the general EW bay.

On the other hand, one can see how the PLS in high volume travels in independent and parallel form in each cell inside the module.

N: represents the entry of PLS to the cell.

O: represents a cell that is made up of an anode and cathode that form its walls, the entry and exit of the flow of PLS and the electrical connections necessary to energize the module.

P: represent the exit of PLS from the cell.

a: anode c: cathode

The lower figure represents a descriptive electric diagram of the EWS module with three operative modules, where the movement of the electric field in series is presented clearly and one can clearly see how the first electrode of the module is only an anode and the last electrode of the module is only a cathode. Also reflected is the management of the flow rates of PLS/Electrolyte/Raffinate/ILS in a parallel manner in each independent module.

FIG. 10/13

The upper figure represents the traditional diagram (state of the art) of an electroplating cell where the electrical fields run in parallel and the flow rates of PLS/Electrolyte/Raffinate/ILS previously extracted by solvents, are not handled in an independent and isolated manner, the flow rates are communicated between anodes and cathodes and in the entire cell.

The lower figure represents a descriptive electric diagram of a traditional cell where the movement of the electric field in parallel is presented clearly. Also reflected is the managing of the flow rates of electrolyte in series in the entire cell.

FIG. 11/13

This figure presents the diagram of the electric circuits with which an EWS module of four EW cells is fed. Operatively, at least two cells are controlled by an independent rectifier. The diagram only shows one cell but, in reality, they control 20 more; it all depends on the design of the plant.

20. Represents the circuit of a rectifier transformer with a nominal current of 500A and voltage of 10V DC. In the case of a larger number of modules (10) maintaining a larger number of cells (10), the total cells would be 100 and their control through a transformer with nominal current of 500A and voltage of 220V.

21. Electrical diagram of continuous current switch.

22. EWS module

23. Cells of the EWS module

24. Connection (evacuation of the cells—piping—valves) that permits removing the crud from the cells to clean them or to empty the PLS/Electrolyte/Raffinate/ILS or another related solution.

FIG. 12/13

This figure presents three lateral diagrams, in an upper and frontal angle of the interconnection between EWS modules.

18. Intermodule connector

25. Continuous current switch

26. Cable from the rectifier

27. Cable toward the switch

FIG. 13/13

This figure presents three photographs of a prototype to scale 15% of the real EWS module, although the EWS module may have other larger dimensions with cathodes ¾among others than the industry and the design required. The photograph on the upper left shows the laboratory prototype connected volumetrically with the PLS/Electrolyte, Raffinate/ILS moving in parallel through each cell. The photograph on the upper right shows the EWS module operating volumetrically and electrically and as you can see, the electrical connections to the rectifier only take place in the electrodes at the ends for the EWS modules because internally the cells are and operate connected in series.

4. Primary collector with multiple unitary outlets for each module.

6. Cathode

11. Holes for the filling of the PLS/Electrolyte/Raffinate/ILS and connection piping $^3/_4$ NPT 17. Exit of individual solution by overflow 26. Cable from the rectifier

DETAILED DESCRIPTION OF THE INVENTION

The productive process of obtaining cathodes of different metals, such as Al, Cu, Zn, Au, among other metals with the same characteristics, preferably copper, begins based on the irrigation of ore pads, where the material is processed previously through an agglomeration stage and subsequently is transported and heaped in an additional pad for this purpose, in the lixiviation (LX) area.

These pads are watered with a raffinate solution that comes from the spent solutions of the cells and then with a recirculated solution of ILS that is formed based on the lixiviation solutions with a low concentration of copper, process water and in addition to the adding of sulfuric acid that the process requires for its progressive enrichment in copper, which is then sent to the electrowinning (EW) area in PLS category.

In this area, the PLS solution is conditioned on line, with the addition and replenishment of the anodic and cathodic additives (cobalt sulfate and guar), reagents (sulfuric acid) and processing water. Prior to entering the electrowinning (EW), the solution is conditioned thermally so that the process is carried out under optimum operating conditions.

On the other hand, volumetrically, once the electrowinning process has been overcome through the EWS (Electrowinning Series) modules, the solution is transported towards a disposal tank (disposal TK), which once again sends the solution towards the initial discharge pool in LX.

The latter is carried out a specific number of times until the copper concentration in the solution is lowered to an established value. Once this objective is achieved, the electrolytic solution, when it leaves the EW bay for the umpteenth time, is derived to the LX area towards the same pool section, but as a raffinate, for re-enrichment in copper and returns to the electrolytic process, thus handling continuous volumes of electrolytic solution.

In the meantime, parallel to this operation, the PLS solution produced in LX is sent simultaneously towards the EWS line in place of the previous one, thus completing the fundamental operation and processing of solutions in the plant between both stages.

Figure 2:
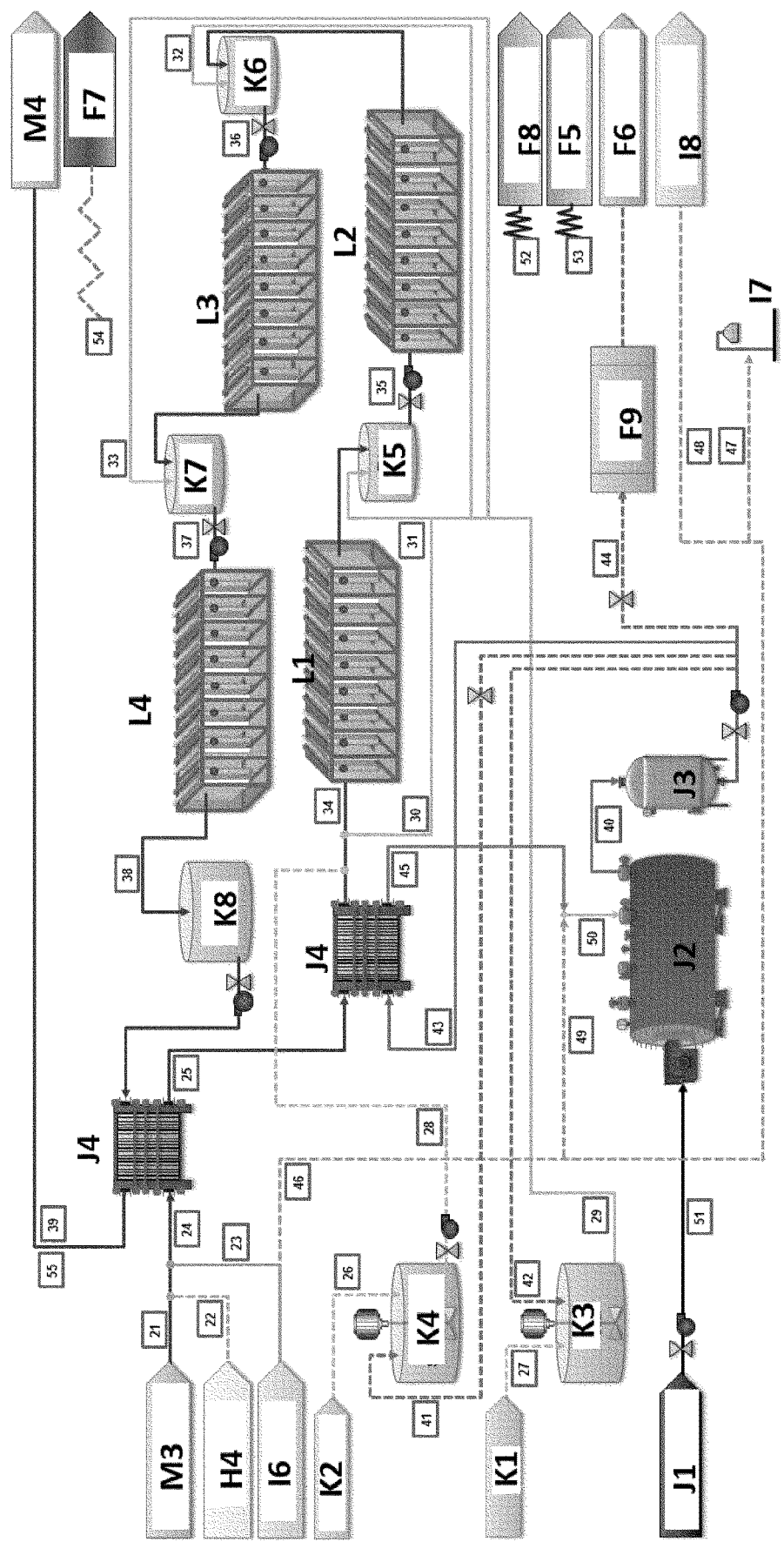

The EW-LED process is applied to the EWS device module formed by many cells in this invention, from which cathodic copper in the form of sheets measuring 1×1 meter or 1 m$^2$ and weighing 42 kg are obtained as the final product, where the cathode assembly plus the copper extracted weighs about 100 kg, with a purity equal to or higher than 98% of Cu, which is stored, packed and dispatched for its commercialization (FIGS. 1 and 2, L1, L2).

Device of the EWS Module

Figure 9:
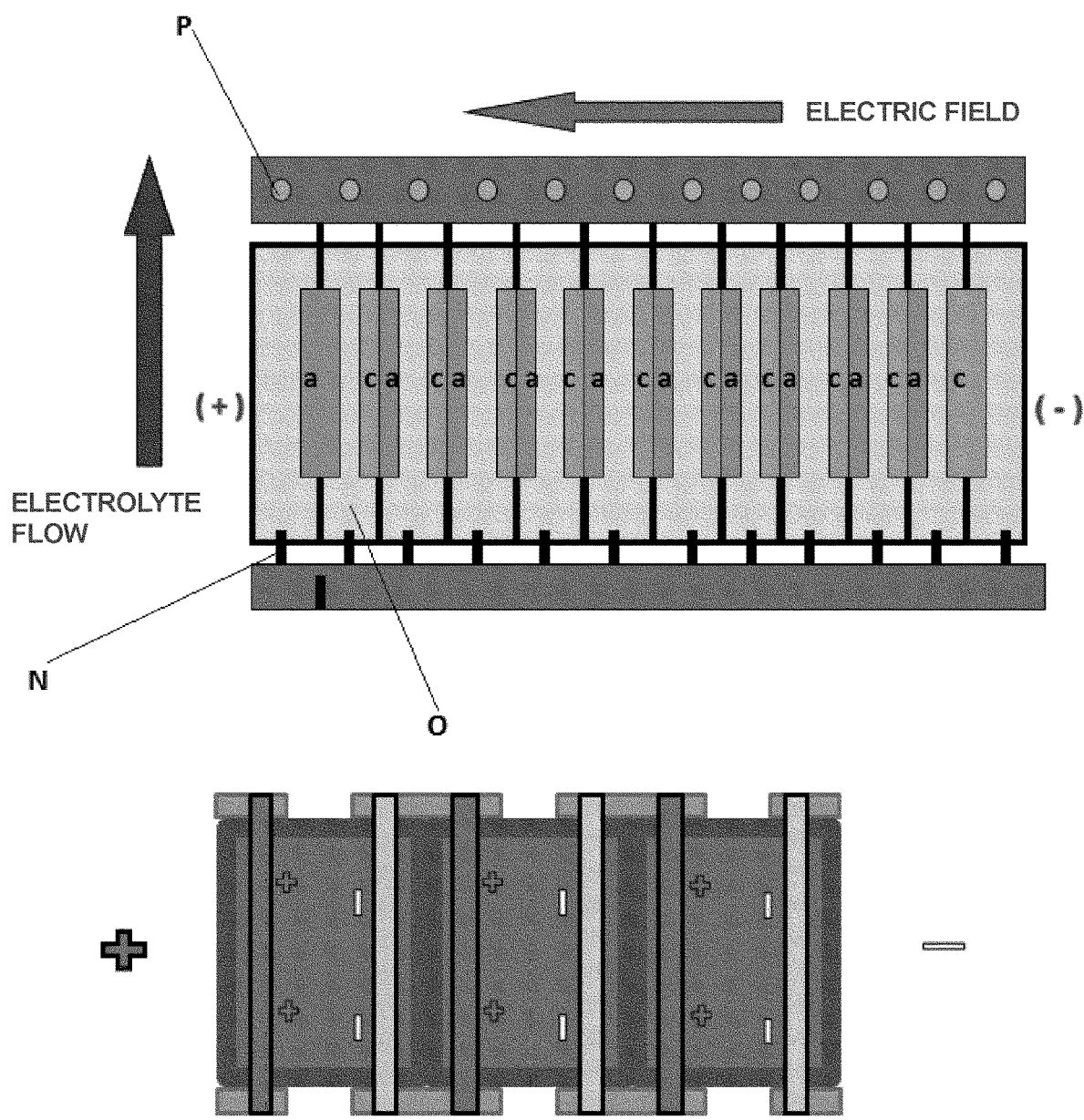

The fresh PLS generated in the lixiviation (LX) stage is sent via piping to the mobile EW-LED plant, in a minimum flow range of 3 liters per minute per square meter of cathode to a maximum of 25 liters per minute per square meter of cathode. Culminating these steps, the PLS is conditioned with cobalt sulfate and guar, and is finally sent towards the EWS modules for the Electrowinning Series (EWS), as can be seen in FIG. 9.

Figure 11:
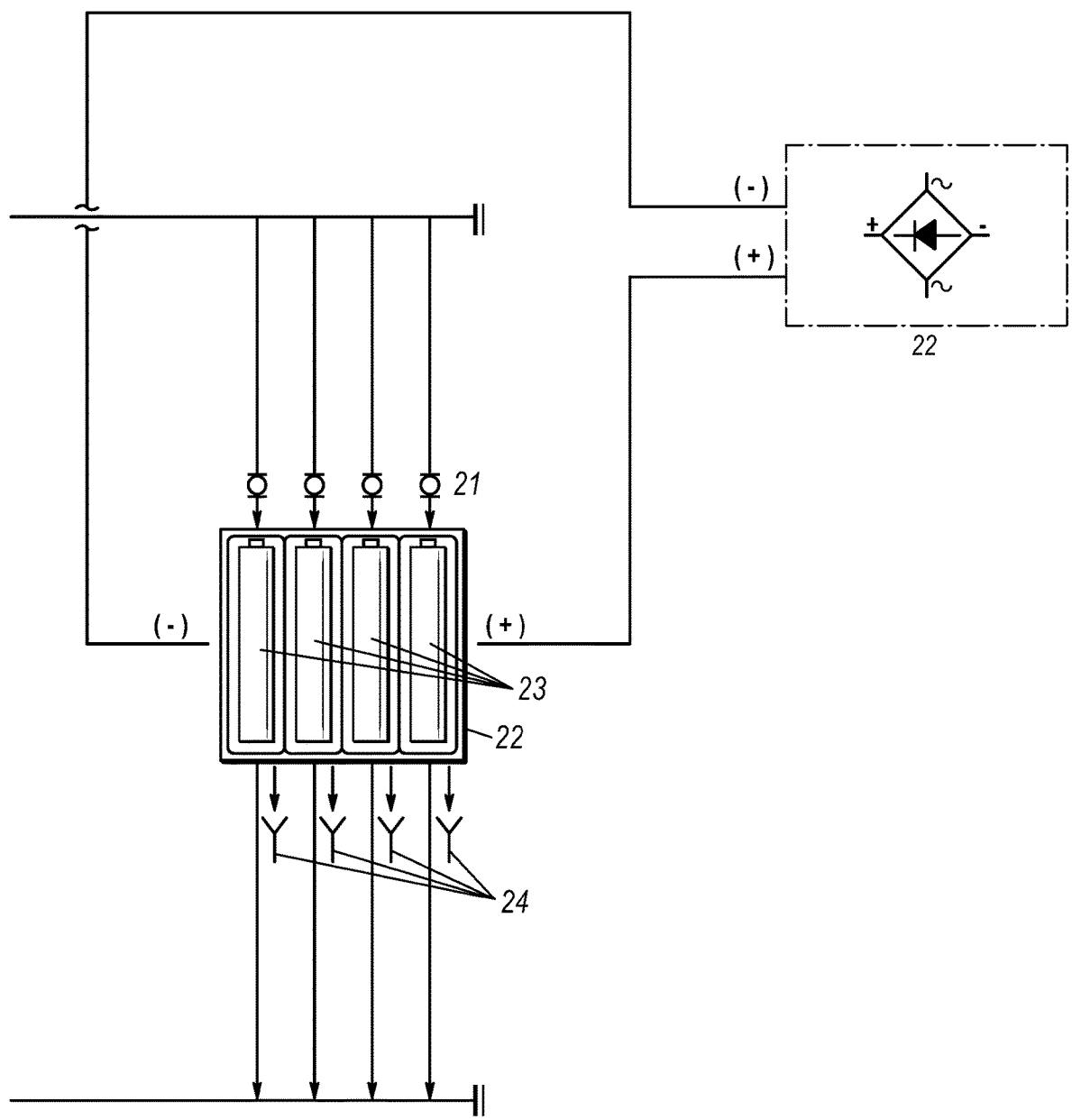

The EWS module device for electrowinning copper (EWS Module) is made up of an assembly of electrolytic cells contained within this cell-shaped module connected in series. Each EWS module has a number of cells (2 to 10) and these, in turn, are each formed by an anode-cathode pair (FIG. 9). Each cell contains a cathode with an operative area of 1 m$^2$, from which a copper product is obtained having the same area mentioned, and from the anode a minimum current density range is imposed of 150 A/m$^2$ and a maximum of 1000 A/m$^2$, preferably 300 A/m$^2$, which is circulated and controlled in series by each cell and EWS module consecutively. This operation format with modules in series (made up of different EWS modules), opens the possibility of working with different current densities in each one of them, considering a minimum current density of preferably between 150 to 170 A/m$^2$, depending on the chemical quality of the PLS to be processed (FIG. 11/13). If the plant works at one same current, it must operate at a nominal current density of 250 A/m$^2$, to achieve the normal production planned.

In the case of processing electrolytes with a high concentration of copper, the density of the current could reach 1000 A/m$^2$.

Figure 5:
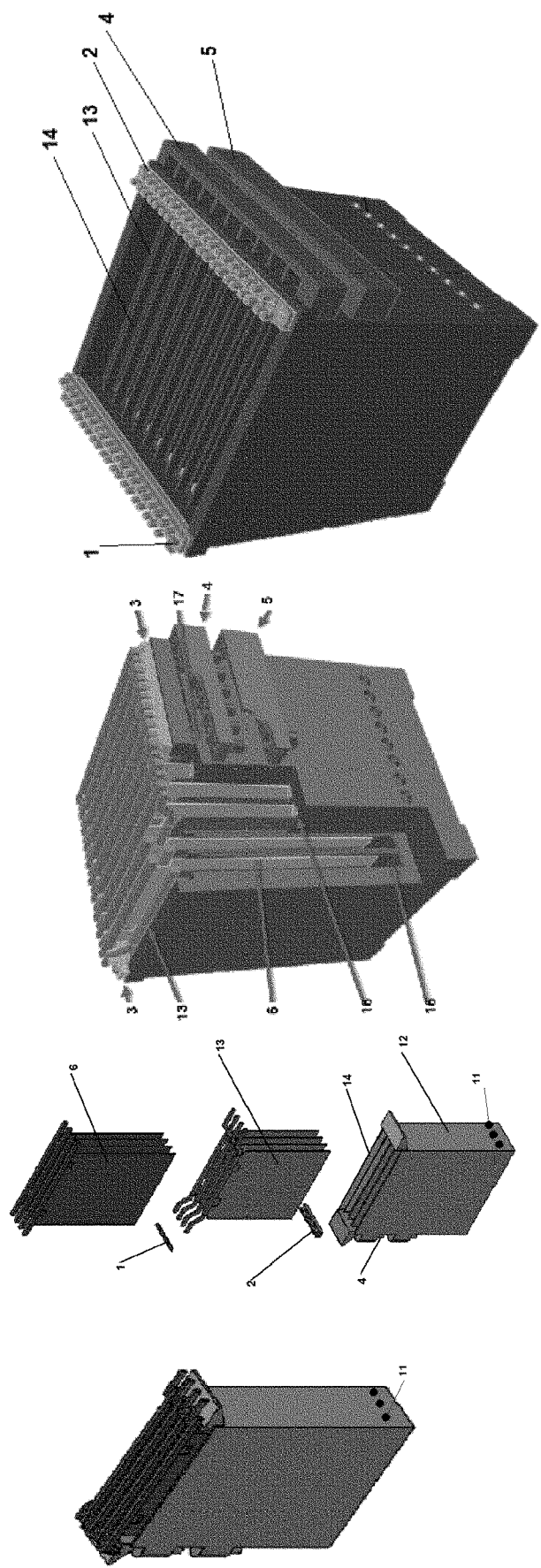

The EWS module itself is a tank with internal separations that define the cathode-anode cells. These separations are airtight, which means that each volume of PLS passes independently through each cell, without connecting volumetrically or electrically with the parallel cells. On the other hand, the electrical connection between cells takes place through an intercell bar (1), which has round, triangular and round lateral forms, preferably a round form where the intercell bar is a discontinuous bar made up of short bars, or pieces that join the cathodes and anodes of the adjacent cells that cover the entire module. These intercell bars are short, so that they can operate independently in each cell, avoiding electrical contact in one same cell. In other words, in the places where the bar is complete, it contacts the anode and cathode of adjacent cells, thus each cell behaves electrochemically in an independent manner and electrically in connection in series with the other cells. These intercell bars (1) are placed in an intercell bar guide (2) which is placed over the capping board (3) to correctly place the bars, cathodes and anodes for a good independent electrical contact per cell. (FIG. 5).

Figure 4:
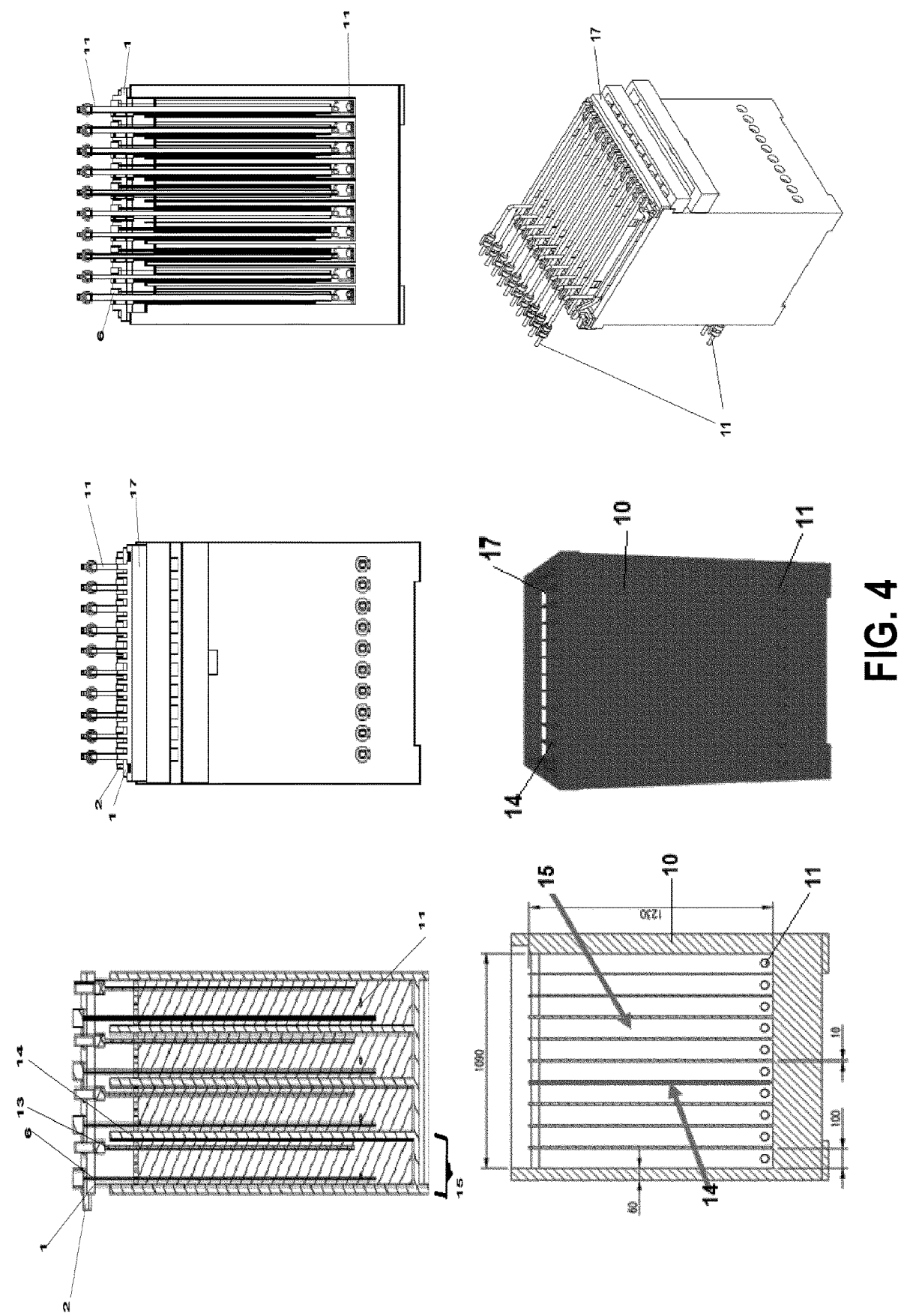
Figure 6:
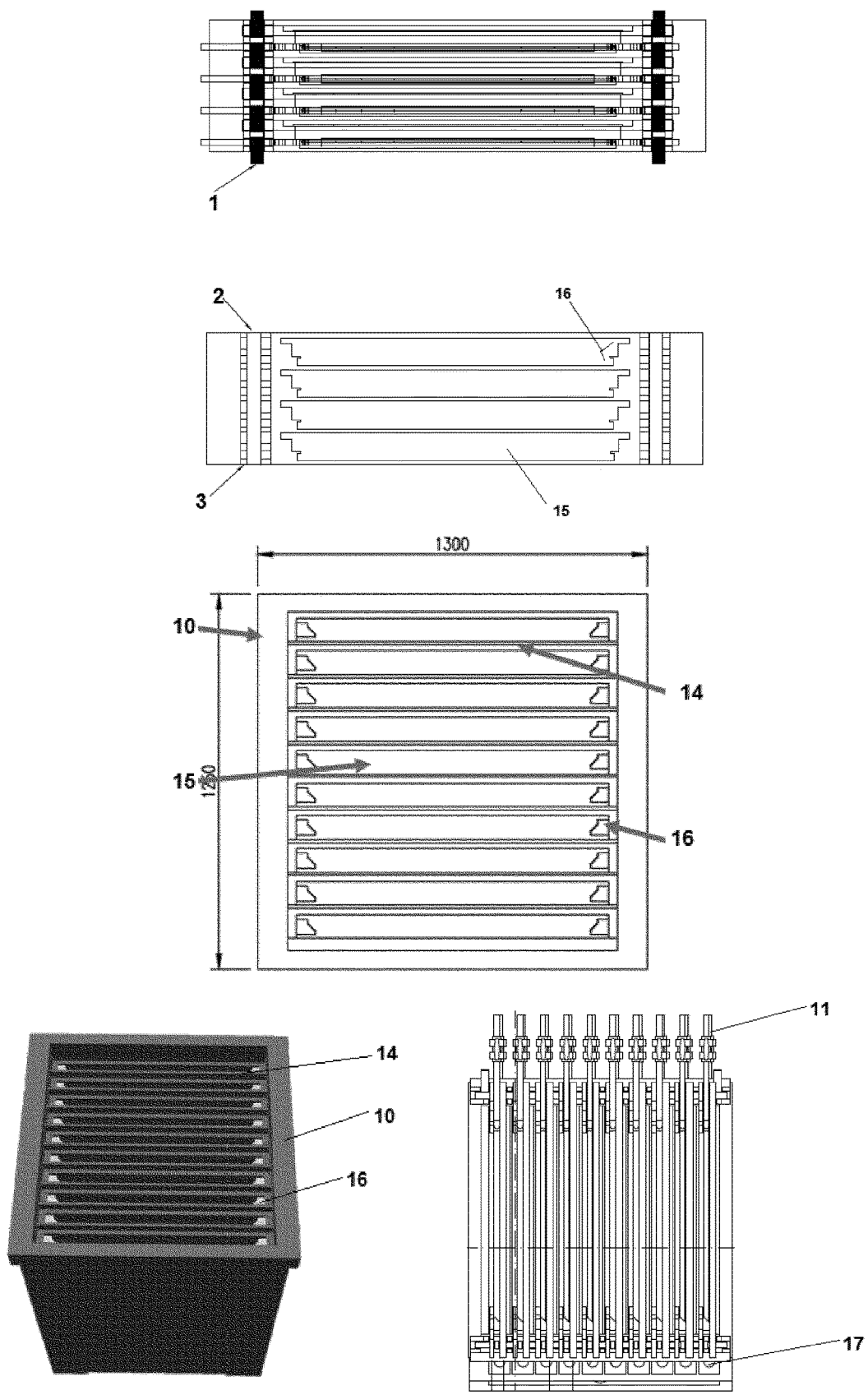
Figure 7:
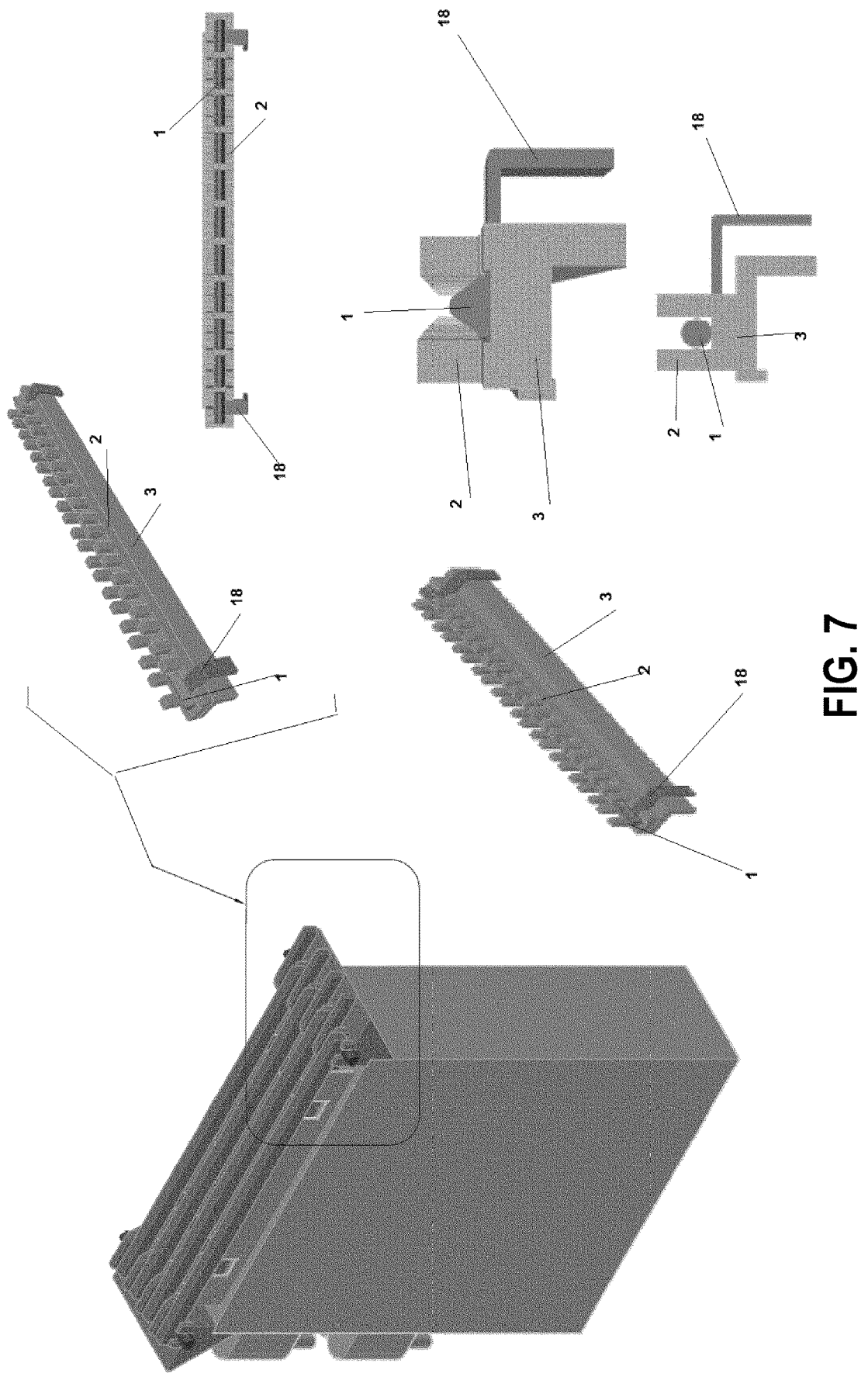

Structurally, the module within the watertight intercell internal separations, has depressions or supports that make fast the cathodes and anodes. These cathodic/anodic depressions or supports (16) leave only one face of the anodes and cathodes exposed because the other face is placed on the watertight intercell dividing wall. This means that the harvesting process of the cathodes is only carried out on one side of the electrode (FIGS. 4 and 6).

The anodic/cathodic supports also permit regulating the separation between the anode and cathode, in the range of 10 to 100 mm, preferably from 15 and 70 mm. This characteristic means that the distance between the centers of anodes and cathodes can be regulated depending on the requirements of the productive process and its efficiency.

The modules and cells operate in the following manner, which includes the stages of:
a) Filling of the EWS module with PLS/Electrolyte/ Raffinate/ILS between 30° C. to 50° C. through the volumetrically independent cells via the piping and upper and lower inlets until the level of the PLS/ Electrolyte/Raffinate/ILS reaches the overflow zone and overflows. This filling is controlled manually or automatically through valves placed in the inlet pipes;
b) Circulation of current from the anode in a minimum current density range of 150 A/m$^2$ and maximum of 1000 A/m$^2$, preferably 300 A/m$^2$ which is circulated and controlled in series by each cell and EWS module consecutively, considering a minimum current of preferably between 150 to 170 A/m$^2$, depending on the chemical quality of the PLS/Electrolyte/Raffinate/ILS to be processed;
c) The EWS modules operate through cycles where the PLS/Electrolyte/Raffinate/ILS passes between 3 and 15 times, preferably 6 times, until the concentration of $Cu^{2+}$ is at the lowest metallurgical minimum possible of about 4 to 5 g/L, which will depend on the physical conditions of the PLS/Electrolyte/Raffinate/ILS being processed;
d) Reaching the selected weight of the metal cathode, preferably copper, preferably between 36 and 56 kg and harvesting of the anodes.

To achieve planned production, the assembly of EWS modules works at one same current, with a nominal current density of 300 A/m$^2$.

Figure 12:
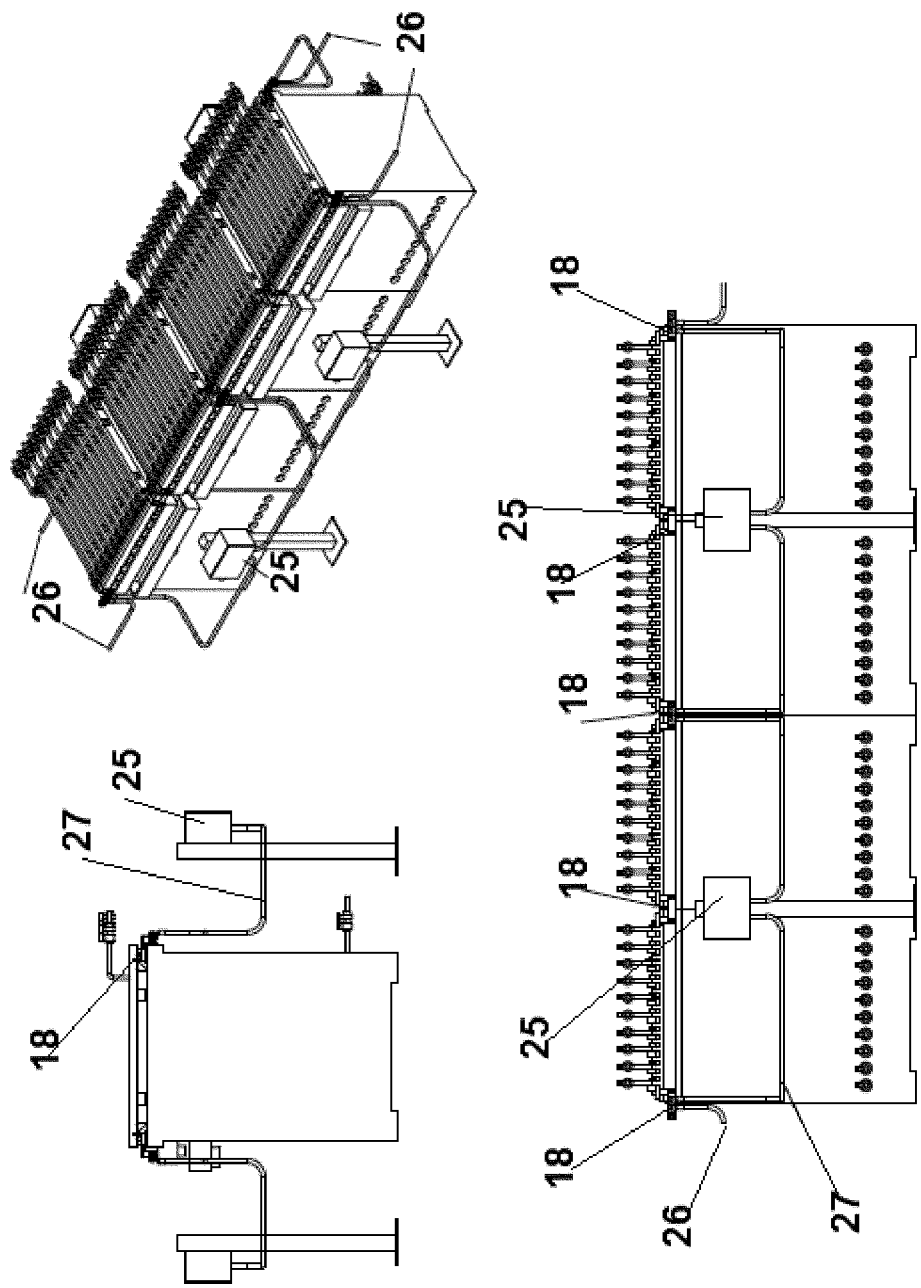

The connection and disconnection process of the different modules, according to FIG. 12, consists of:

After the copper cathodes reach a weight predetermined by the operator, preferably in the range of 36 and 56 kg, specifically 42 kg, the control system (PLC) that keeps control of the current applied to the cathodes (directly by Faraday's Law) uses a signal to activate the opening of the continuous current switches that permit the disconnection of the EWS module and thus of its cells (bridging of the EWS modules) that permit harvesting the cathodes of the cells;

In parallel, the flow of PLS/Electrolyte/Raffinate/ILS continues circulating freely through the cells of the EWS Module that is being harvested; this means that when the cells are loaded with new cathodes, the concentration of copper will be uniform and the temperature of the solution will be uniform;

Electrical physical disconnection of modules arranged together (consecutive) through the separation of the intermodule connectors (18), following upon the bridging of the circuit through a continuous current switch;

Lifting the cathode assembly and harvesting the metal, preferably copper, through a cathode holder connected to the hoist;

Replacement of previously prepared cathodes in the cells of the EWS module;

Connection of new module via intermodule continuous current switches (18), thus eliminating the electric bridge formed by the continuous current switches leaving the continuous electrical connection of all existing modules plus the new integrated module, without requiring the detaining of the complete process, only the module to be harvested.

Figure 3:
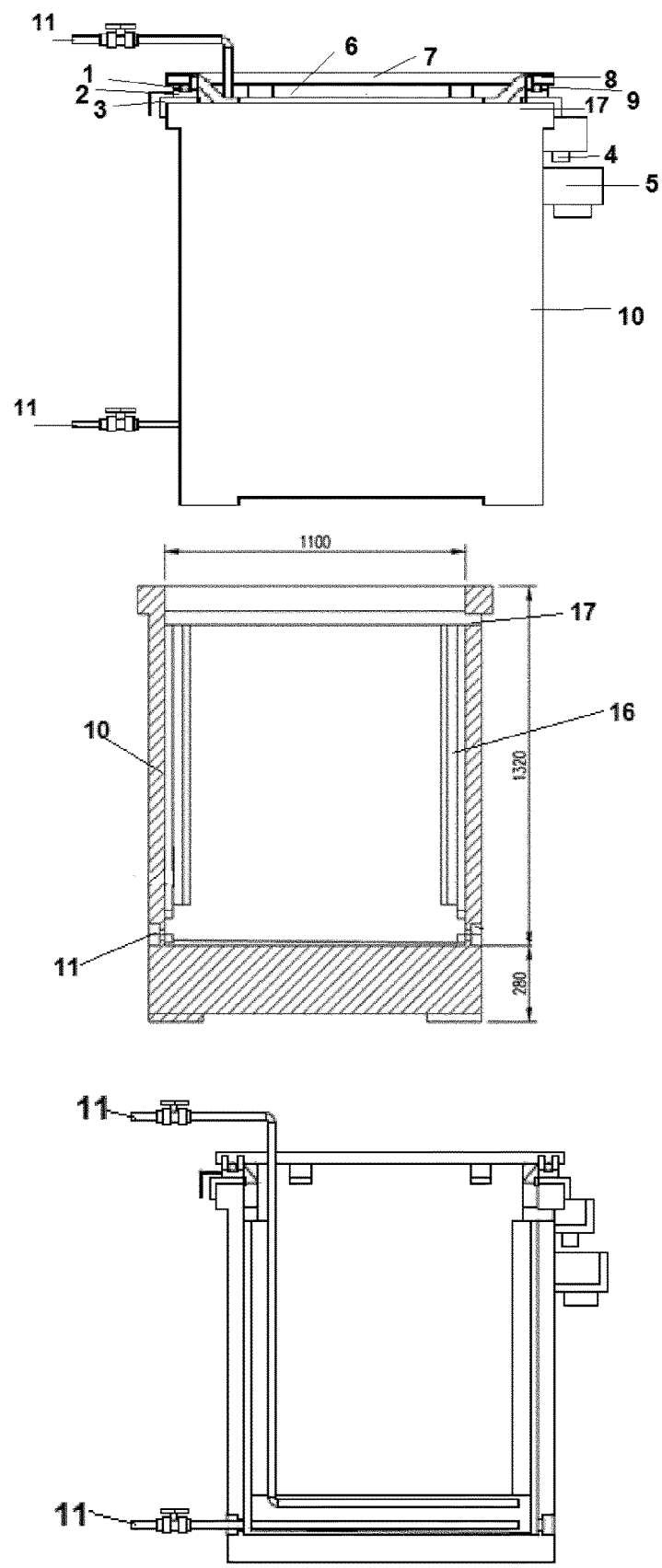

Volumetrically, the PLS/Electrolyte/Raffinate/ILS that enters the EWS module, penetrates through the upper part of each module (11) through the feed piping of each cell (each cell also has a lower electrolyte input and an independent outlet through each cell) and it spills over (17) as is shown in FIGS. 3 and 4.

Figure 8:
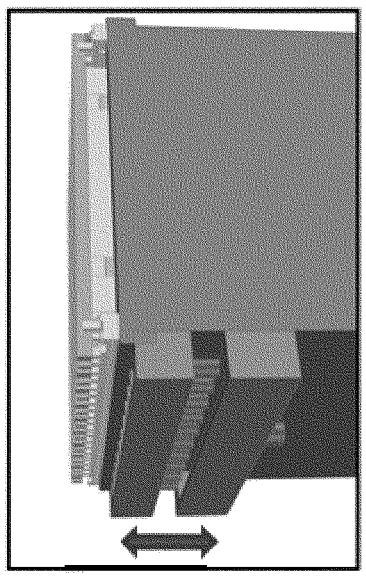
Figure 8:
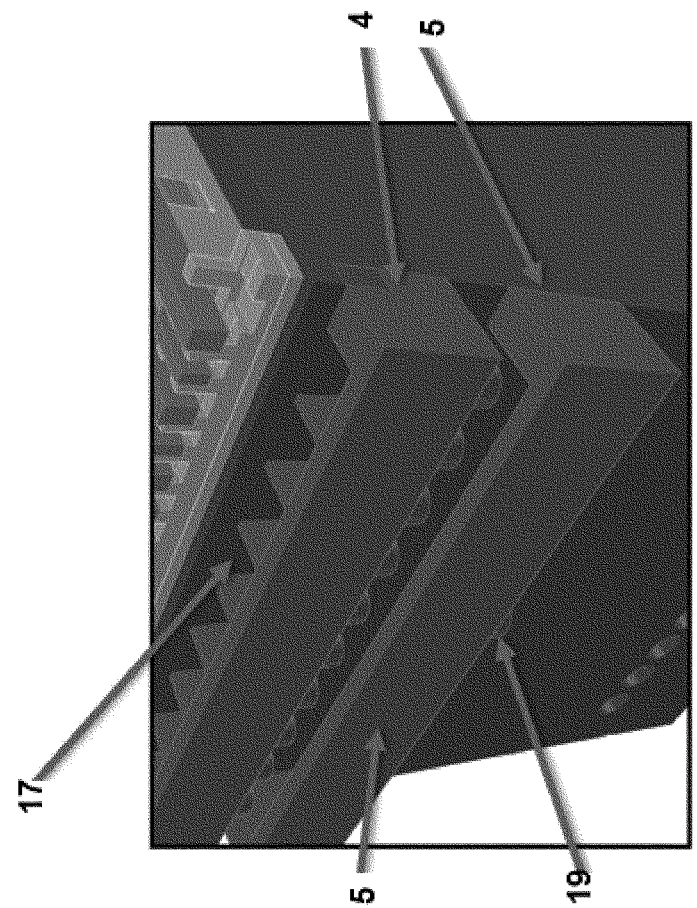

After the PLS/Electrolyte/Raffinate/ILS overflows it is captured independently by each cell via an outlet (17) that falls into a primary collector (4) that independently releases the flow of PLS/Electrolyte/Raffinate/ILS to a secondary collector (5) separated physically from the primary collector to avoid electrical losses (as presented in FIG. 8). The secondary collector releases the PLS/Electrolyte/Raffinate/ILS to the next accumulation tank (K5, K6, K7 and K8 of FIGS. 1 and 2).

The material used to manufacture the EWS modules is anticorrosive material, such as polymeric concrete structures coated in fiberglass, in general, materials that are resistant to PLS/Electrolyte/Raffinate/ILS. On the other hand, a specific example of its dimensions is 1.300×1.250×1.600 mm (length, width and height respectively), without restricting other measurements required in view of its application.

The material used to manufacture the electrodes will depend on the quality of the water to be used in the plant. If water with a high content of active chlorine is used, such as seawater, both electrodes will be titanium-based, and in the case of water being used that is light in chlorides or chloride-free, such as potable water or demineralized water, conventional electrodes will be used: stainless steel 316L as cathodes and lead-calcium-tin alloy in the anodes.

The PLS/Electrolyte/Raffinate/ILS in circulation in the EW bay is conducted from module to module by a drive system through feed tanks previously situated individually in each module, adding, at the same time, a replacement solution of Guar.

Once the outgoing solution has been treated in the modules, it is sent to a transfer tank (Transfer TK) and driven towards the E/E heat exchanger up to the PLS sub-pool in recirculation batch, thus fulfilling a cycle of PLS passage in the plant (as can be seen in FIGS. 1 and 2, J4).

This operation of cycles (sending and returning of PLS in process from LX) is carried out between 3 and 15 times, preferably 6 times, until the concentration of $Cu^{2+}$ is lowered to the minimum metallurgically possible (around 4 to 5 g/L), which will depend on the physical conditions of the electrolyte being processed, which in turn will depend on the characteristics of the ore processed and also on the operation being executed.

The final product of the EW-LED process is cathodic copper in sheets of approximately 42 kg, with an area of 1 $m^2$ and a purity equal or higher than 98%; which is washed, detached from the cathode, rolled and stored in the dispatch patio for its commercialization (FIGS. 1 and 2, F7).

Figure 10:
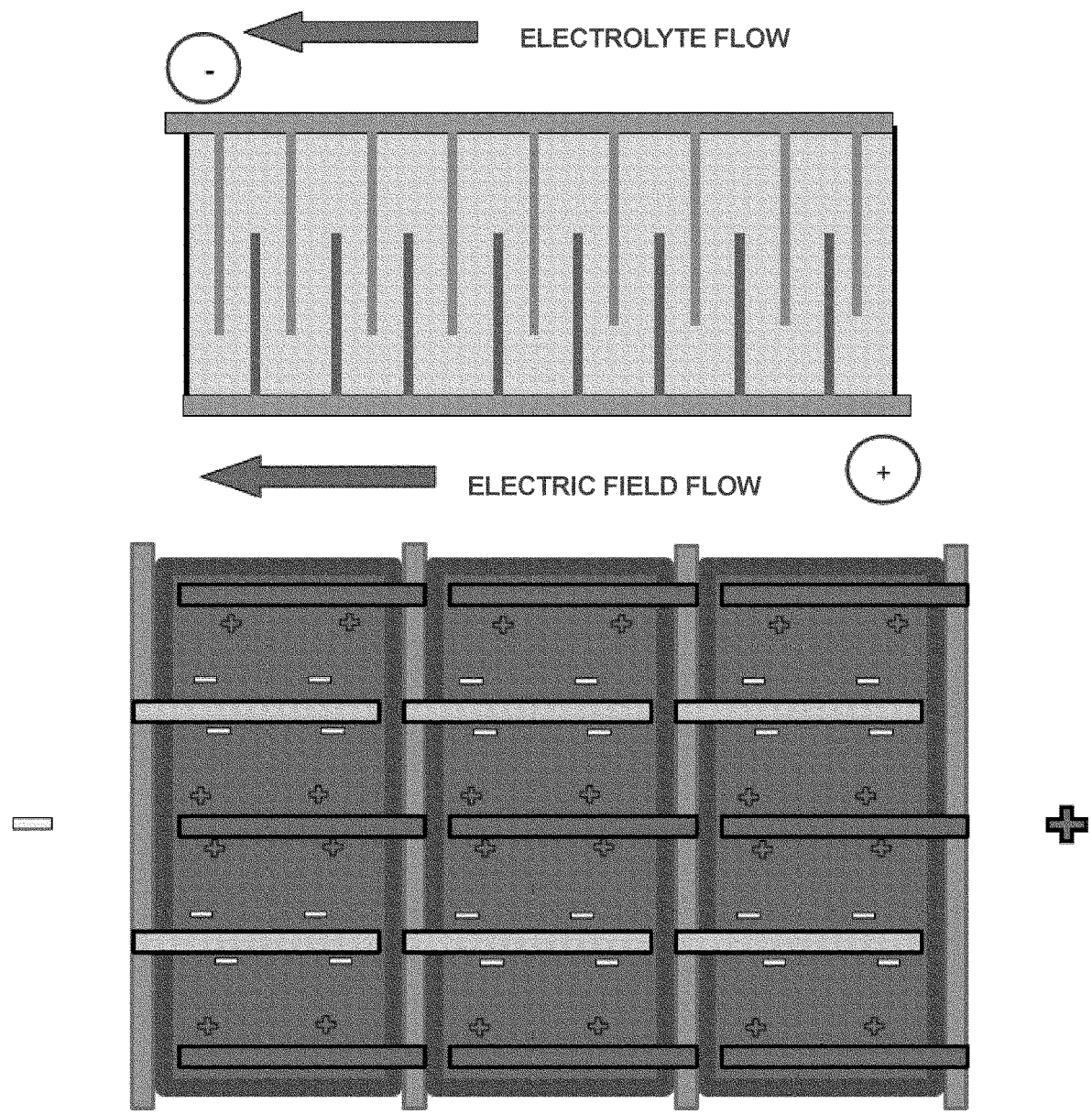

To summarize, the LED module is used in a new hydrometallurgical process that presents four big innovations, with respect of the conventional process, that are the following:

Permits electrowinning copper cathodes, where the continuous current of the electric power system is exactly the same as the current the electrochemical process requires for electrowinning the cathodes, permitting a direct control over Faraday's law to determine the weight of the cathodes that will be harvested. That is, the electrowinning process is a circuit of continuous current in series (FIG. 9), while the conventional technology is in parallel (FIG. 10).

The electrowinning of copper in the cells can be carried out from solutions of: PLS, ILS, Raffinate, Pregnant Electrolyte or discard electrolyte of the electrowinning, differing from the conventional process that requires the extraction by solvents stage to obtain pregnant electrolyte that is the only solution it accepts to feed the cells for electrowinning high quality cathodes.

The flow of PLS that feeds the electrowinning cells is over 5 times the flow of electrolyte that conventional plants require.

The electrowinning can be carried out from low concentrations of PLS that go from 5 to 50 g/L, obtaining cathodes with a high concentration of copper (from 97%).

The low temperature (30° C. to 50° C.) that the conditioning of the PLS requires when entering the electrowinning module, results in a lower generation of corrosive gases from the modules and their need to be extracted, and also reduces the consumption of electricity.

Operation of the EWS Module

The flow of PLS required in this process feeds, in parallel and in series, the different EWS modules of the electrowinning cells which must contain between 4 to 50 grams of copper per liter of solution, at the moment of starting the process, reagents such as guar gum and cobalt sulfate are incorporated into the solution, with a dosage of about 320 grams and 220 ppm per ton of copper produced respectively, as additives for the cathodes and the anodes respectively prior to entering the cells of the EWS modules.

The PLS is recirculated with a flow in parallel-series configuration in the system until it is resent to the lixiviation heaps when it is between 4 and 6 grams of copper per liter of solution.

Another relevant aspect for the optimum functioning of the EW-LED process is the temperature of the PLS that feeds the EWS modules and thus the cells, which must oscillate between 30 and 50° C.

On the other hand, each electrowinning EWS module, EW-LED, consists of between 2 to 20 cells, with a preferred configuration in the EW bay that consists of 60 operative cells, volumetrically independent and compact, with each one of the cells formed by a cathode and an anode; the distribution of the electrical connections in the cells are connected in series between cathodes and anodes and integrated, with the purpose of maintaining an identical continuous current and the same current density in the entire module and intermodules; the operative area of the cathode lies within the range of 0.3 $m^2$ to 2 $m^2$ preferably 1 $m^2$; the density of the current is regulated in the module in a range between 0 and 500 amperes, with an operative current density between 150 and 500 amperes per $m^2$ of cathode; there is also a channeling with independent control of the flow of PLS/Electrolyte/Raffinate/ILS per cell and module; and an independent electric field for each one of the cells through the electricity fed by rectifier transformers (FIG. 11).

A specific example of this invention is the EW bay where the EWS process is produced. This EW bay is made up of a series of modules, between 1 to 10 EWS modules, preferably 6, and each module contains between 1 and 20 cells, preferably 10. Therefore, a preferred configuration would have a total of 60 cathodes in the EW bay.

One of the important parts of the module is channeling, with independent control of the flow of PLS/Electrolyte/Raffinate/ILS that permits feeding with a variable flow, between 3 and 30 L/min/$m^2$ of cathode, to a group of modules and independently to each electrowinning cell.

There is a direct relationship between the control of the flow of PLS/Electrolyte/Raffinate/ILS, that depends on the concentration of copper in the solution and the number of operative cells that are used in the electrowinning of copper. This relationship states that the smaller the concentration of copper in the solution the greater the flow and permits controlling the continuous current in the electrowinning process.

DESCRIPTION OF THE FIGURES

FIG. 1

The figure represents a general diagram of the productive process in which this invention is inserted.

The line of arrows of the upper part of the diagram shows the physical phenomena that the water suffers in the different positions of the movement of the ore:
- X: Impulse pumps
- O: Flow controllers and temperature meters
- F1: Evaporation of the mixed pool
- F2: Evaporation of the ILS pool
- F3: Evaporation piles
- F4: Evaporation in EW
- F5: Decomposition of water by electrolysis
- F6: Washing water to discard
- F7: Production of copper cathode The line immediately below the arrows of the upper part shows the behavior of the solid material in the different positions of the movement of the ore:
- G1: Agglomerated ore from the crusher-binder
- G2: Dynamic pile
- G3: Gravel to dump In the following line of arrows, the handling of the acid is presented:
- H1: Sulfuric acid from trucks
- H2: Acid TK
- H3: Sulfuric acid to agglomeration.

In the following line of arrows, the handling of the process water is presented:
- I1: Process water from water supply
- I2: Service water
- I3: ILS pool
- I4: Mixed pool
- I5: Emergency pool The last line presents the system's heating network:
- J1: Oil supply
- J2: Boiler
- J3: Water conditioning chamber
- J4: Heat exchangers There are other parts associated to the adaptation and preparation of the LPS before the EW-LED:
- K1: Chemical product, concentrated Guar
- K2: Chemical product, concentrated cobalt sulfate
- K3: Guar TK, this is a tank where the Guar is diluted in water and is left at an optimum concentration to be applied to the PLS that is sent to the cells of the modules of the EW-LED plant.
- K4: Cobalt TK, this is a tank where the cobalt sulfate is diluted in water and is left at an optimum concentration to be applied to the PLS that is sent to the cells of the EWS modules of the EW-LED plant.
- K5: TK Bank 2, this is a tank where the PLS/Electrolyte/Raffinate/ILS is received, in series, when it has passed once through the first bank of the EW-LED system. (Without restricting the number of banks to be used except when the concentration of the PLS/Electrolyte/Raffinate/ILS reaches a range below 4 g/L.)
- K6: TK Bank 3, this is a tank where the PLS/Electrolyte/Raffinate/ILS is received in series when it has passed once through the second bank of the EW-LED system. (Without restricting the number of banks to be used except when the concentration of PLS/Electrolyte/Raffinate/ILS reaches a range below 4 g/L.)
- K7: TK Bank 4, this is a tank where the PLS/Electrolyte/Raffinate/ILS is received, in series, when it has passed once through the third bank of the EW-LED system. (Without restricting the number of banks to be used except when the concentration of copper in the PLS solution reaches a range below 4 g/L.)
- K8: TK transfer bank, this is a tank where the PLS is received, in series, that has passed once through the fourth bank of the EW-LED system. (Without restricting the number of banks to be used except when the concentration of the PLS reaches a range below 4 g/L.) The PLS used is transferred to the mixed pool.
- L1: EW-LED bank No 1 (this invention)
- L2: EW-LED bank No 2 (this invention)
- L3: EW-LED bank No 3 (this invention)
- L4: EW-LED bank No 4 (this invention)

FIG. 2

This figure represents a flow diagram of the Electrowinning process direct in series EW-LED.

In the line of arrows of the lower right part of the diagram, the physical phenomena that the water suffers in the different positions of the movement of the ore are presented:
- F5: Decomposition of water by electrolysis
- F6: Washing water to discard
- F7: Production of copper cathodes
- F8: Evaporation of water by atmosphere
- F9: Cathode washing water The following line of arrows presents the handling of the acid:
- X: Impulse pumps
- O: Flow controllers and temperature meters
- H4: Sulfuric Acid to EW-LED.

The following line of arrows presents the handling of the process water:
- 16: Process water to EW-LED
- 17: LX emergency shower
- 18: Service water for human consumption The last line presents the system's heating network:
- J1: Oil supply
- J2: Boiler
- J3: Water conditioning chamber
- J4: Heat exchangers There are other parts associated to the adaptation and preparation of the PLS before the EW-LED:
- K1: Chemical product, concentrated Guar
- K2: Chemical product, concentrated cobalt sulfate
- K3: Guar TK, this is a tank where the Guar is diluted in water and is left at an optimum concentration to be applied to the PLS that is sent to the cells.
- K4: Cobalt TK, this is a tank where the cobalt sulfate is diluted in water and is left at an optimum concentration to be applied to the PLS that is sent to the cells.
- K5: TK Bank 2, this is a tank where the PLS is received, in series, when it has passed once through the first bank of the EW-LED system. (Without restricting the number of banks to be used except when the concentration of the PLS reaches a range below 4 g/L.)
- K6: TK Bank 3, this is a tank where the PLS is received, in series, when it has passed once through the second bank of the EW-LED system. (Without restricting the number of banks to be used except when the concentration of the PLS reaches a range below 4 g/L.)
- K7: TK Bank 4, this is a tank where the electrolyte in series is received when it has passed once through the third bank of the EW-LED system. (Without restricting the number of banks to be used except when the concentration of copper in the PLS solution reaches a range below 4 g/L.)
- K8: TK transfer bank, this is a tank where the PLS is received, in series, that has passed once through the fourth bank of the EW-LED system. (Without restricting the number of banks to be used except when the concentration of the PLS reaches a range below 4 g/L.)

The PLS used is transferred to the mixed pool.

L1: EW-LED bank No 1
L2: EW-LED bank No 2
L3: EW-LED bank No 3
L4: EW-LED bank No 4

The following line of arrows presents the handling of the PLS and a line:

M3: PLS/PLS recirculated from LX
M4: PLS recirculated/raffinate to LX

The following numbering also shows:

21: PLS to conditioning
22: Sulfuric acid to line
23: Process water to line
24: PLS to E/E heat exchanger
25: PLS to E/A heat exchanger
26: Cobalt sulfate to Cobalt Sulfate TK
27: Guar to Guar TK
28: Cobalt sulfate solution
29: Guar solution to distribution
30: Guar solution to Bank EW 1
31: Guar solution to Bank EW 2
32: Guar solution to Bank EW 3
33: Guar solution to Bank EW 4
34: PLS to Bank EW 1
35: PLS to Bank EW 2
36: PLS to Bank EW 3
37: PLS to Bank EW 4
38: PLS to Transfer TK
39: PLS in recirculation to pool
40: Hot water from heater
41: Hot water to Cobalt Sulfate TK
42: Hot water to Guar TK
43: Hot water to heat exchanger
44: Hot water to cathode washing
45: Hot water in return
46. Process water to services and operation
47. Water to EW-LED emergency service
48. Service water to human consumption
49. Process water to replacement
50: Water to heater
51: Petroleum to heater
52: Evaporation of water in EW bay
53: Decomposition of water in EW bay
54. Cathodic copper
55: Discharge of raffinate to LX

FIG. 3

The Figure represents the lateral exterior view of a EWS module of 4 cells, a lateral interior section of an EWS module of 4 cells, and the upper and lower filling circuits of the PLS/Electrolyte/Raffinate/ILS).

1: Intercell bar
2: Intercell guide bar
3: Capping board
4: Primary collector with multiple unitary outlets for each module
5: Secondary collector with single outlet of the harvesting of the primary collector
6. Cathode
7. Transversal bar of the cathode
8. Transversal bar of the anode
9. Structural arm of the anode
10. Exterior wall of the module
11. Holes for filling the PLS/Electrolyte/Raffinate/ILS, connection piping ¾ NPT
16. Anodic/cathodic supports
17. Discharge of individual solution by overflow

FIG. 4

The images correspond to a lateral interior representation of the module, front and rear exterior lateral views of the module, the module with 10 cells in a rear interior lateral view, a module in volume with 10 cells in a rear exterior view at an angle that permits viewing the discharge by overflowing of the PLS/Electrolyte/Raffinate/ILS, and a module in volume with 10 cells in an isometric exterior view at an angle that permits seeing the entry and exit by overflow of the PLS/Electrolyte/Raffinate/ILS, including the PLS/Electrolyte/Raffinate/ILS entry pipes.

1. Intercell bar
2. Intercell guide bar
6. Cathode
9. Structural arm of the anode
10. Exterior wall of the module
11. Holes for the filling of the PLS/Electrolyte/Raffinate/ILS, connection piping ¾ NPT
13. Anode
14. Internal wall of the module
15. Cell
17. Exit of individual solution by overflow.

FIG. 5

The figure represents a stripped conceptual volumetric image of the module, an upper lateral-frontal volumetric integral image with a section of the module with cathodes and anodes, and finally, an upper lateral-frontal volumetric integral detailed image of the module without cathodes and anodes. (For greater clarity, all the images do not show the entry pipes of PLS/Electrolyte/Raffinate/ILS).

1. Intercell bar
2. Intercell guide bar
3. Capping board
4. Primary collector with multiple unitary outlets for each module
5. Secondary collector with single outlet of the gathering of the primary collector.
6. Cathode
11. Holes for filling of the PLS/Electrolyte/Raffinate/ILS, connection piping ¾ NPT
12. External lateral wall of the module (this wall is narrower than the frontal wall)
13. Anode
14. Internal wall of the module
15. Cell
16. Anodic/cathodic supports
17. Exit of individual solution by overflow

FIG. 6

The figure presents a view from above of the module where the position of the cathodes and anodes of 4 cells can be seen and where the module is seen empty for 4 cells, a view from above of the 10-cell module without cathodes and anodes, a volumetric view from above of the 10-cell module without cathodes and anodes, and an upper schematic view of the 10-cell module with the entry pipes of the PLS/Electrolyte/Raffinate/ILS and with the exit cavities for the same.

1. Intercell bar
2. Intercell guide bar
3. Capping board
10. Exterior wall of the module
11. Holes for filling of the PLE/Electrolyte/Raffinate/ILS and connection piping ¾ NPT.
14. Internal wall of the module
14. Cell
16. Anodic/cathodic supports
17. Exit of individual solution by overflow

FIG. 7

This figure shows, an isometric view in volume of the layout of the cathodes and anodes in the EWS module, a zoom on the connections between the electrodes and the Capping board, with a triangular type intercell bar, the same configuration but with a circular type intercell bar, an upper view of the capping board, two lateral views of the capping board, a triangular type intercell bar, and a circular type intercell bar.

1. Intercell bar
2. Intercell guide bar
3. Capping board
18. Intermodule connector (this piece permits connecting the continuous current switches, connecting or disconnecting each module electrically).

FIG. 8

The figure presents the devices in volume of the exit of the PLS/Electrolyte/Raffinate/ILS from the EWS module, and the separation that must exist between the collectors that permits an adequate isolation, avoiding leaks of the current of the electrowinning process (the outlet tubes of the first collector are not in contact with any piece of the second collector).

4. Primary collector with multiple unitary outlets for each module.
5. Secondary collector with only outlet of the harvesting of the primary collector
17. Exit of individual solution by overflow
19. Only exit of PLS/Electrolyte/Raffinate/ILS of the secondary collector.

FIG. 9

The upper figure represents an extended structural descriptive diagram of the EWS module (possesses more than 4 modules), where one can clearly see how the electric field in series runs maintaining an even load volume in all the cells, EWS modules and in the general EW bay.

On the other hand, one can see how the PLS in high volume travels in independent and parallel form in each cell inside the module.

N: represents the entry of PLS to the cell.
O: represents a cell that is made up of an anode and cathode that form its walls, the entry and exit of the flow of PLS and the electrical connections necessary to energize the module.
P: represents the exit of PLS from the cell.
a: anode
c: cathode The lower figure represents a descriptive electric diagram of the EWS module with three operative modules, where the movement of the electric field in series is presented clearly and one can clearly see how the first electrode of the module is only an anode and the last electrode of the module is only a cathode. Also reflected is the management of the flow rates of PLS/Electrolyte/Raffinate/ILS in a parallel manner in each independent module.

FIG. 10

The upper figure represents the traditional diagram (state of the art) of an electroplating cell where the electrical fields run in parallel and the flow rates of PLS/Electrolyte/Raffinate/ILS previously extracted by solvents, are not handled in an independent and isolated manner, the flow rates are communicated between anodes and cathodes and in the entire cell.

The lower figure represents a descriptive electric diagram of a traditional cell where the movement of the electric field in parallel is presented clearly. Also reflected is the managing of the flow rates of electrolyte in series in the entire cell.

FIG. 11

This figure presents the diagram of the electric circuits with which an EWS module of four EW cells is fed. Operatively, at least two cells are controlled by an independent rectifier. The diagram only shows one cell but, in reality, they control 20 more; it all depends on the design of the plant.

20. Represents the circuit of a rectifier transformer with a nominal current of 500 A and voltage of 10V DC. In the case of a larger number of modules (10) maintaining a larger number of cells (10), the total cells would be 100 and their control through a transformer with nominal current of 500 A and voltage of 220V.
21. Electrical diagram of continuous current switch.
22. EWS module
23. Cells of the EWS module
24. Connection (evacuation of the cells-piping-valves) that permits removing the crud from the cells to clean them or to empty the PLS/Electrolyte/Raffinate/ILS or another related solution.

FIG. 12

This figure presents three lateral diagrams, in an upper and frontal angle of the interconnection between EWS modules.

18. Intermodule connector
25. Continuous current switch
26. Cable from the rectifier
27. Cable toward the switch

FIG. 13

This figure presents three photographs of a prototype to scale 15% of the real EWS module, although the EWS module may have other larger dimensions with cathodes 1 m², 1.1 m², 1.2 m² among others than the industry and the design required. The photograph on the upper left shows the laboratory prototype connected volumetrically with the PLS/Electrolyte, Raffinate/ILS moving in parallel through each cell. The photograph on the upper right shows the EWS module operating volumetrically and electrically and as you can see, the electrical connections to the rectifier only take place in the electrodes at the ends for the EWS modules because internally the cells are and operate connected in series.

4. Primary collector with multiple unitary outlets for each module.

6. Cathode

11. Holes for the filling of the PLS/Electrolyte/Raffinate/ILS and connection piping ¾ NPT 17. Exit of individual solution by overflow 26. Cable from the rectifier

EXAMPLES OF APPLICATION

Figure 13:
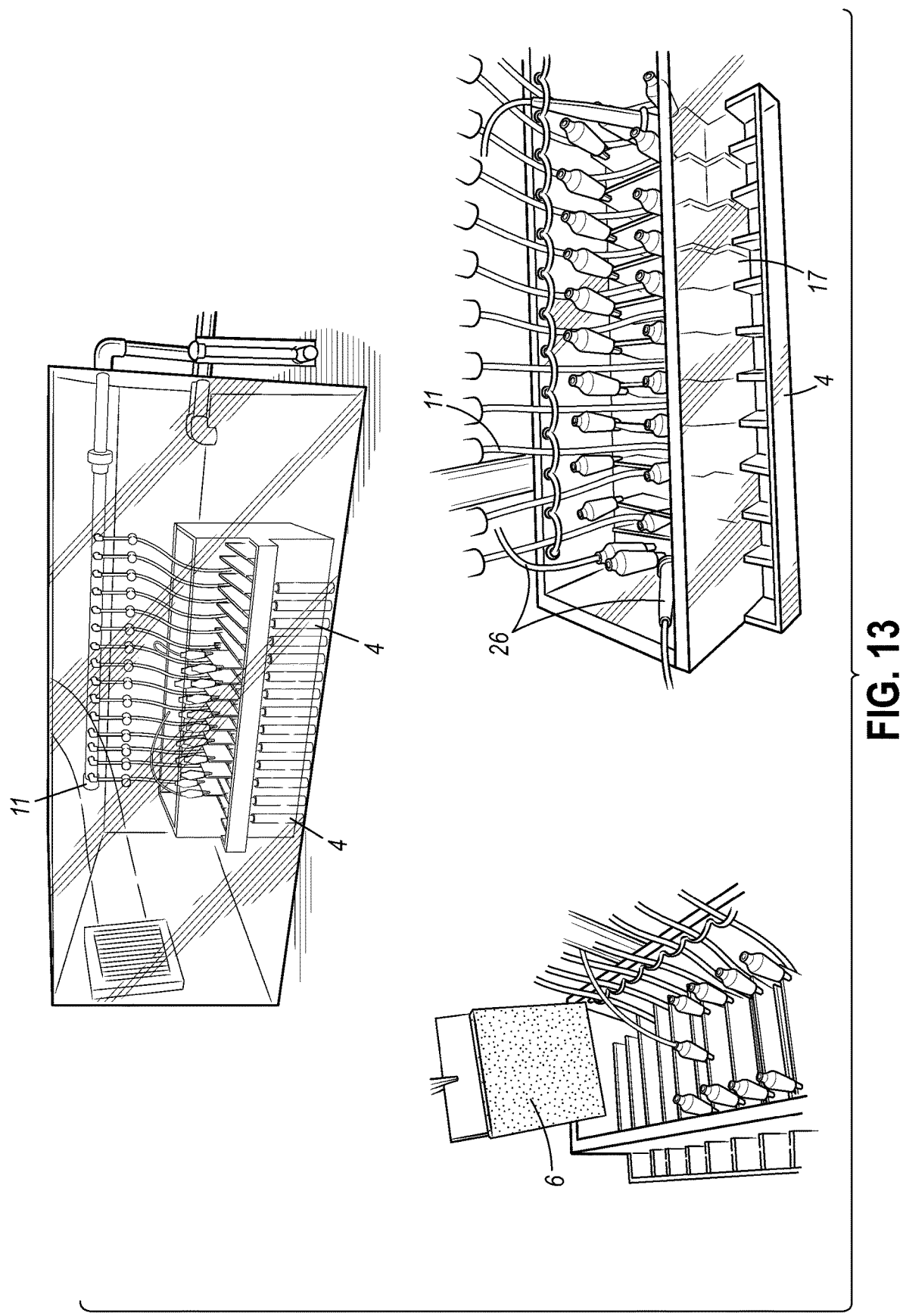

This application example presented in FIG. 13 shows a laboratory device at a scale at 15% (FIG. 13) of what would be the real prototype dimensioned at 1 m² of cathode, without restricting that the dimension of the cathodes is given mainly by the model that the customer finally needs. Other measurements of 1.1 m² or 1.2 m² can also exist.

The concentrations of copper handled for this equipment were about 14 to 15 g/l of PLS per pass in the electrolytic cells with flow rates from 2.5 to 3.0 l/min/m² of cathode. With a current density of 1.73 A/m² after 24 to 34 hours, copper cathodes between 40 and 70 grams were obtained, 99.99% purity, with a current efficiency between 95% and 99%.

The invention claimed is:

1. An EWS module device for electrowinning and/or electrorefining, based on a pregnant leach solution (PLS) without extraction by solvents, comprising: a tank; a group of electrolytic cells contained within the tank, where the cells are separated electrically and volumetrically by internal walls of the EWS module device and the cells are connected in series by a capping board; an intercell bar; an intercell guide bar; entry and exit ducts for a mixed solution of PLS/Electrolyte/Raffinate/intermediate leach solution (ILS) and for each cell independently; and an intermodule connector for interconnecting the EWS module device to another EWS module device, where the intermodule connector regulates the connection and disconnection of the EWS module device via a continuous current switch, wherein the electrolytic cells include two consecutive internal walls of the EWS module device; one anodic/cathodic support that permits regulation of the separation between anode and cathode from 15 to 70 mm; a single cathode and a single anode, each with an area of 1 m², always leaning on one of the internal walls of the cell; the capping board; the intercell bar; the intercell guide bar; the entry and exit for the mixed solution of PLS/Electrolyte/Raffinate/ILS and by each cell independently; and the intermodule connectors at the ends of the intercell bars.

2. The EWS module device of claim 1, wherein the tank is separated internally and hermetically through the internal walls of the EWS module device where the number of internal walls is equivalent to the number of cells that the EWS module device will take and is from 4 to 100.

3. The EWS module device of claim 1, wherein the anodic/cathodic support is made in a single piece that positions the single anode and single cathode against the one of the internal walls of the cell of the EWS module device such that only one side of the single anode and of the single cathode is operative.

4. The EWS module device of claim 1, wherein the intercell bars have lateral forms, triangular or round, and in length the ends are exposed to be connected via the intermodule connectors, also, the intercell bar to be able to operate independently in each cell, is a discontinuous bar made up of short bars that connect the anode of one cell with the cathode of the adjacent cell to permit the continuity of the electric connection in series, the short bars avoid the contact between an anode and a cathode of one same cell, with this electrical configuration in series each cell behaves electrically independently.

5. The EWS module device of claim 4, wherein the intercell bars are placed or within an intercell guide bar that is positioned over the capping board to correctly place the bar, cathodes and anodes for a good independent electrical contact per cell.

6. The EWS module device of claim 1, wherein the entry and exit ducts of the mixed solution of PLS/Electrolyte/Raffinate/ILS are positioned in each cell independently, where two entry ducts may be placed in a bottom or in an upper part of the cell in opposed positions and the exit duct receives the mixed solution of PLS/Electrolyte/Raffinate/ILS when it overflows in the upper part in the EWS module device, independently for each cell.

7. The EWS module device of claim 6, wherein the exit ducts channel the mixed solution of PLS/Electrolyte/Raffinate/ILS to a primary collector independently by each cell and this primary collector delivers the mixed solution of PLS/Electrolyte/Raffinate/ILS independently and separated mechanically to a secondary collector that delivers the mixed solution of PLS/Electrolyte/Raffinate/ILS of all the cells through a single duct to an accumulation tank independently.

8. The EWS module device of claim 2, wherein the tank's dimensions are 1.300×1.250×1.600 mm (length, width and height, respectively) and the tank is made up of an anticorrosive material, which includes polymeric concrete, structures covered with fiberglass, in general, materials resistant to PLS/Electrolyte/Raffinate/ILS at temperatures in the range of 30° C. to 70° C.

9. The EWS module device of claim 1, wherein the material of the electrodes used as cathodes and anodes will depend on the water to be used in the electrolysis process, where if the water has a high content of active chlorine both electrodes (cathode and anode) will be titanium based, and if water light in or free of chlorides is used, conventional stainless steel 316 L electrodes will be used as cathodes and the anodes will be made of a lead-calcium-tin alloy.

10. An operation process of the EWS module device according to claim 1, consisting of the stages of:

a) Filling of the EWS module device with the mixed solution of PLS/Electrolyte/Raffinate/ILS between 30° C. to 50° C. through the volumetrically independent cells via piping to the entry ducts until the level of the mixed solution of PLS/Electrolyte/Raffinate/ILS reaches an overflow zone and overflows, the filling being controlled manually or automatically through valves placed in the piping;

b) Circulating current from an anode of each of the cells with a minimum current density of 150 A/m² and a maximum current density of 1000 A/m², which is circulated and is controlled in series by each cell and by the EWS module device consecutively, where the minimum current density is between 150 to 170 A/m², depending on the chemical quality of the mixed solution of PLS/Electrolyte/Raffinate/ILS to be processed;

c) Operating the EWS module device through cycles where the mixed solution of PLS/Electrolyte/Raffinate/ILS passes between 3 and 15 times until the concentration of $Cu^{2+}$ is lowered to the minimum that is metallurgically possible of around 4 to 5 g/L, which will depend on the physical conditions of the mixed solution of PLS/Electrolyte/Raffinate/ILS being processed; and d) Reaching a selected weight of a copper cathode of each of the cells between 36 and 56 kg and harvesting the anodes.

11. The operation process of claim 10 wherein stage b) includes assembling a plurality of the EWS module devices working at one same current, with a nominal current density of 300 A/m², to achieve a normal planned production.

12. The operation process of claim 11, further comprising the stages of:
   e) After the copper cathodes reach the selected weight, a control system (PLC) that controls current applied to the cathodes activates by means of a signal the opening of the continuous current switches that permit the disconnection of the EWS module device or bridging of the EWS module devices, that permit harvesting the cathodes of the cells;
   b) In parallel, continue circulating the flow of the mixed solution of PLS/Electrolyte/Raffinate/ILS freely through the cells of the EWS Module device that is being harvested, which permits that when the cells are loaded with new cathodes, the copper concentration will be uniform and the temperature of the mixed solution will be uniform;
   c) Physical electrical disconnection of EWS module devices placed together consecutively through the separation of the intermodule connectors (18) after bridging the circuit via the continuous current switch;
   d) Raising the cathodes and harvesting the copper through a cathode holder connected to a hoist;
   e) Replacing previously prepared cathodes in the cells of the EWS module device;
   f) Connecting a new EWS module device via the intermodule continuous current switches (18), thereby eliminating the electric bridge made by the continuous current switches, leaving the continuous electric connection of all the existing EWS module devices plus the new EWS module device integrated, without needing to detain the complete process, only that of the EWS module device to be harvested.

* * * * *

UNITED STATES PATENT AND TRADEMARK OFFICE
CERTIFICATE OF CORRECTION

PATENT NO. : 10,584,423 B2
APPLICATION NO. : 15/541166
DATED : March 10, 2020
INVENTOR(S) : Paulina Alejandra Godoy Melo et al.

It is certified that error appears in the above-identified patent and that said Letters Patent is hereby corrected as shown below:

On the Title Page

Item (57), ABSTRACT, Line 3, "solution of PLS/electrolyte/raffimate/ILS without solvent" should be --solution of PLS/electrolyte/raffinate/ILS without solvent--.

In the Specification

Column 1, Line 25, "Chile is one of the principle producers" should be --Chile is one of the principal producers--.
Column 7, Lines 41-43, "(For greater clarity, all the images do not show the entry pipes of PLS/Electrolyte/Raffinate/ILS." should be --(For greater clarity, all the images do not show the entry pipes of PLS/Electrolyte/Raffinate/ILS).--.
Column 8, Line 51, "process (the outlet tubes of the first collector are not in contact with any piece of the second collector." should be --process (the outlet tubes of the first collector are not in contact with any piece of the second collector).--.
Column 9, Line 9, "P: represent the exit of PLS from the cell." should be --P: represents the exit of PLS from the cell.--.
Column 9, Lines 63-64, "module may have other larger dimensions with cathodes 3/4among others than" should be --module may have other larger dimensions with cathodes $1 \text{ m}^2$, $1.1 \text{ m}^2$, $1.2 \text{ m}^2$ among others than--.

In the Claims

Column 23, Lines 8-10, Claim 12, "The operation process of claim 11, further comprising the stages of:
  e) After the copper cathodes reach the selected weight, a control system (PLC) that controls current applied to the cathodes activates by means of a signal the opening of the continuous current switches that permit the disconnection of the EWS module device or bridging of the EWS module devices, that permit harvesting the cathodes of the cells;

Signed and Sealed this
Eighteenth Day of May, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,584,423 B2 b) In parallel, continue circulating the flow of the mixed solution of PLS/Electrolyte/Raffinate/ILS freely through the cells of the EWS Module device that is being harvested, which permits that when the cells are loaded with new cathodes, the copper concentration will be uniform and the temperature of the mixed solution will be uniform;

c) Physical electrical disconnection of EWS module devices placed together consecutively through the separation of the intermodule connectors (18) after bridging the circuit via the continuous current switch;

d) Raising the cathodes and harvesting the copper through a cathode holder connected to a hoist;

e) Replacing previously prepared cathodes in the cells of the EWS module device;

f) Connecting a new EWS module device via the intermodule continuous current switches (18), thereby eliminating the electric bridge made by the continuous current switches, leaving the continuous electric connection of all the existing EWS module devices plus the new EWS module device integrated, without needing to detain the complete process, only that of the EWS module device to be harvested." should be --The operation process of claim 1, further comprising the stages of:

e) After the copper cathodes reach the selected weight, a control system (PLC) that controls current applied to the cathodes activates by means of a signal the opening of the continuous current switches that permit the disconnection of the EWS module device or bridging of the EWS module devices, that permit harvesting the cathodes of the cells;

f) In parallel, continue circulating the flow of the mixed solution of PLS/Electrolyte/Raffinate/ILS freely through the cells of the EWS Module device that is being harvested, which permits that when the cells are loaded with new cathodes, the copper concentration will be uniform and the temperature of the mixed solution will be uniform;

g) Physical electrical disconnection of EWS module devices placed together consecutively through the separation of the intermodule connectors (18) after bridging the circuit via the continuous current switch;

h) Raising the cathodes and harvesting the copper through a cathode holder connected to a hoist;

i) Replacing previously prepared cathodes in the cells of the EWS module device;

j) Connecting a new EWS module device via the intermodule continuous current switches (18), thereby eliminating the electric bridge made by the continuous current switches, leaving the continuous electric connection of all the existing EWS module devices plus the new EWS module device integrated, without needing to detain the complete process, only that of the EWS module device to be harvested.--.